(12) United States Patent
Iwamoto et al.

(10) Patent No.: US 8,988,871 B2
(45) Date of Patent: Mar. 24, 2015

(54) ELECTRONIC APPARATUS AND BUFFER MATERIAL

(71) Applicant: Panasonic Corporation, Kadoma-shi, Osaka (JP)

(72) Inventors: Akira Iwamoto, Osaka (JP); Hitoshi Nakatani, Osaka (JP); Takeshi Mori, Osaka (JP); Shun Shimazaki, Osaka (JP); Takahiro Tabata, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 123 days.

(21) Appl. No.: 13/779,243

(22) Filed: Feb. 27, 2013

(65) Prior Publication Data
US 2014/0063727 A1    Mar. 6, 2014

(30) Foreign Application Priority Data

Aug. 30, 2012    (JP) ................. 2012-190595

(51) Int. Cl.
| | |
|---|---|
| H05K 5/00 | (2006.01) |
| H05K 7/00 | (2006.01) |
| G06F 1/16 | (2006.01) |
| G11B 33/08 | (2006.01) |
| F16F 13/04 | (2006.01) |
| F16F 15/08 | (2006.01) |
| F16F 3/093 | (2006.01) |

(52) U.S. Cl.
CPC ............. *G11B 33/08* (2013.01); *F16F 13/04* (2013.01); *F16F 15/08* (2013.01); *F16F 3/093* (2013.01); *F16F 2230/007* (2013.01); *F16F 2228/14* (2013.01)

USPC ........... 361/679.33; 361/679.34; 361/679.35; 361/679.36

(58) Field of Classification Search
USPC .............. 361/679.33, 679.34, 679.35, 679.36
See application file for complete search history.

(56) References Cited

U.S. PATENT DOCUMENTS

| | | | |
|---|---|---|---|
| 6,751,092 B1 | 6/2004 | Ohnishi et al. | |
| 7,990,639 B2 * | 8/2011 | Ouellette et al. | 360/1 |
| 2004/0190193 A1 * | 9/2004 | Kuwajima | 360/97.01 |
| 2008/0158712 A1 * | 7/2008 | Nakatani | 360/71 |

FOREIGN PATENT DOCUMENTS

| | | |
|---|---|---|
| JP | 2004-315087 | 11/2004 |
| JP | 2008-171554 | 7/2008 |
| JP | 2008-291986 | 12/2008 |
| JP | 2009-264483 | 11/2009 |

* cited by examiner

*Primary Examiner* — Anthony Haughton
(74) *Attorney, Agent, or Firm* — Hamre, Schumann, Mueller & Larson, P.C.

(57) ABSTRACT

Mounted between bottom and top surfaces of a case are: second buffer materials and first buffer materials brought in surface contact with a bottom surface of a hard disk drive (HDD) via an insulating member, and upper buffer materials brought in surface contact with the opposite side of the HDD via the insulating member. When impact F2 is applied to the HDD, the second buffer materials contract from a thickness of T0 to T2, and the first buffer materials buckle. Buckling parts of the first buffer materials buckle when the second buffer materials contract to thickness T2, and can achieve impact-lessening independently from the second buffer materials. The second buffer materials contract singly from T0 to equal T1 to or more than T2, whereas the first buffer materials and second buffer materials both act at thickness T2 or beyond. Therefore, impact-lessening can be achieved in a broad range.

10 Claims, 34 Drawing Sheets

ELECTRONIC APPARATUS AND BUFFER MATERIAL

BACKGROUND OF THE INVENTION

1. Field of the Invention

The present disclosure relates to a buffer material and an electronic apparatus having mounted therein an electronic component disposed on the buffer material.

2. Description of the Background Art

One example of an electronic apparatus is a notebook type personal computer disclosed in Japanese Laid-Open Patent Publication No. 2008-171554. Japanese Laid-Open Patent Publication No. 2008-171554 discloses, a plurality of small pieces of vibration and/or impact absorbers for absorbing vibration and/or impacts, which are disposed between a disk device and a lid member covering a disk device storing section provided in a housing of the notebook type personal computer, and a sheet material disposed between the disk device and the plurality of small pieces of vibration and/or impact absorbers. Also disclosed therein is a configuration in which two types of the small pieces of the vibration and/or impact absorbers having mutually different vibration and/or impact absorption properties are disposed thickly on an outer circumference side of the disk device and thinly on an inner circumference side of the disk device.

SUMMARY OF THE INVENTION

The present disclosure provides an electronic apparatus and a buffer material configured to improve vibration and/or impact-absorbing capability by arranging two types of buffer materials having different behavior when absorbing load that acts between a first component and a second component.

The electronic apparatus of the present disclosure includes: a first component; a second component disposed adjacent to one part of the first component; and a buffer part interposed between the first component and the second component. The buffer part includes: a first buffer material, partially buckles when the load, acting between the first component and the second component, exceeds a predetermined value, and that has restorability to its original shape after buckling, and a second buffer material configured to deform in response to a load that is smaller than the predetermined value and that acts between the first component and the second component.

An electronic apparatus having this configuration can broadly lessen vibration and/or impacts applied from outside.

In addition, the buffer material of the present disclosure includes: a first buffer material that is configured to partially buckle when a load exceeding a predetermined value is applied and that has restorability to its original shape after buckling; a second buffer material configured to deform in response to a load that is smaller than the predetermined value and that is applied in a direction identical to that applied on the first buffer material; and a contacting surface on which the first buffer material and the second buffer material are disposed.

DESCRIPTION OF THE PREFERRED EMBODIMENTS

In the following, an electronic apparatus and buffer materials of one embodiment of the present disclosure will be described with reference to the drawings. It should be noted that, in the present embodiment, a notebook personal computer (hereinafter, abbreviated as PC) is used as an example of an electronic apparatus, and a hard disk drive (hereinafter, abbreviated as HDD) that is to be built in a PC is used as an example of a first component. However, there will be instances in which detailed description beyond what is necessary is omitted. For example, detailed description of subject matter that is previously well-known, as well as redundant description of components that are substantially the same will in some cases be omitted. This is to prevent the following description from being unnecessarily lengthy, in order to facilitate understanding by a person of ordinary skill in the art.

The inventors provide the following description and the accompanying drawings in order to allow a person of ordinary skill in the art to sufficiently understand the present disclosure, and the description and the drawings are not intended to restrict the subject matter of the scope of the patent claims.

[Configuration of PC]

Figure 1:
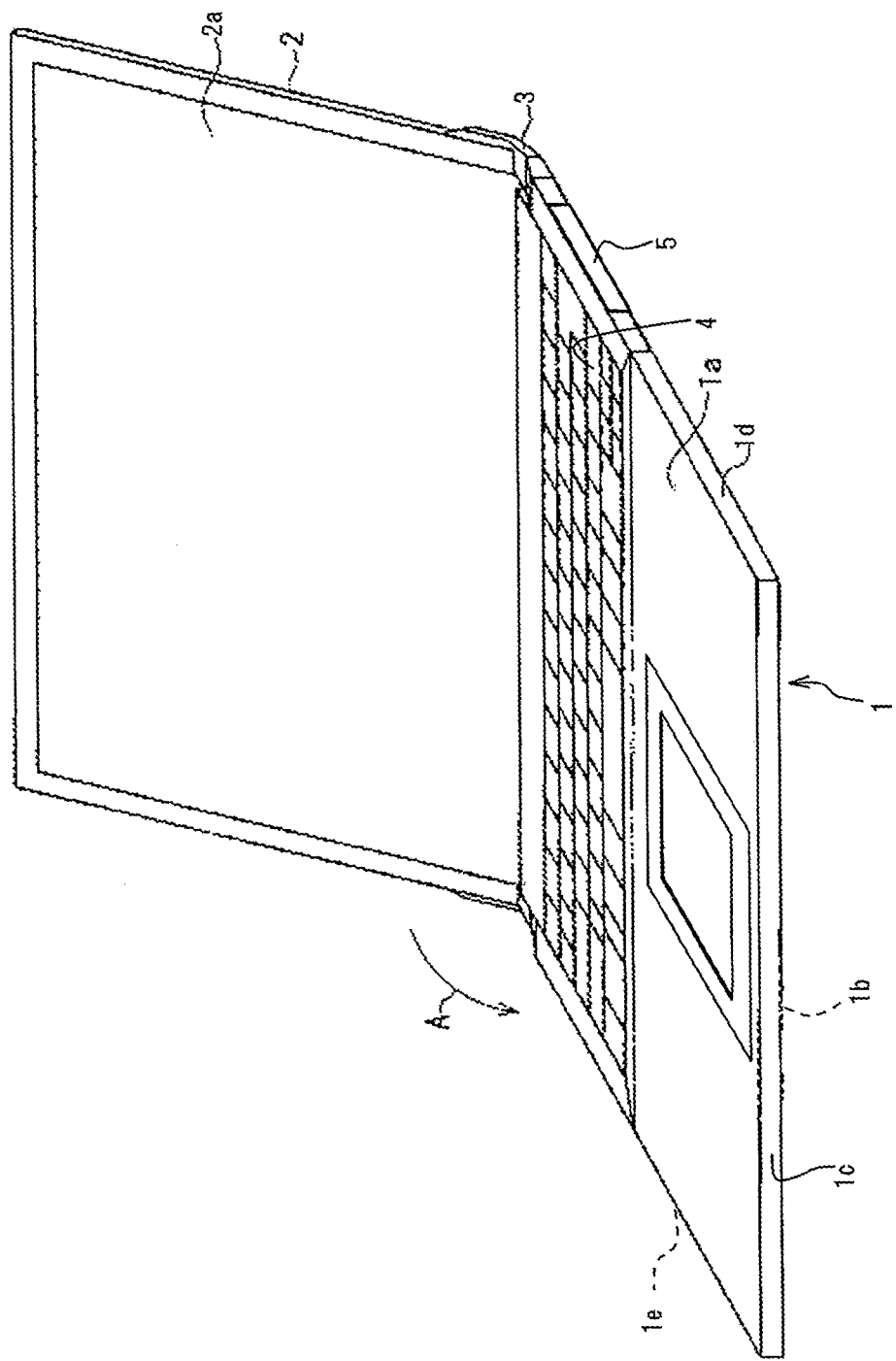
FIG. 1 is an exterior perspective view of a notebook personal computer (PC)

A PC shown in FIG. 1 includes a hinge 3 supporting an operation housing 1 and a display housing 2 such that the PC can be opened and closed. The PC can be closed by rotating the display housing 2 in an arrow A direction so as to shut the display housing 2. FIG. 1 shows an operative state in which a user operates the PC.

The operation housing 1 has: an obverse surface 1a on which a keyboard 4 and the like are arranged; a reverse surface 1b opposing the obverse surface 1a through an interior space having built-in therein a circuit board mounted with a central integrated circuit and various electronic components, a battery, etc.; a front surface 1c that faces an operator side when the PC is in the operative state; a left lateral surface 1d and a right lateral surface 1e which are respectively on the left side and the right side of an operator in the operative state; and a rear surface opposing the front surface 1c through the keyboard 4. Furthermore, the display housing 2 includes a display panel 2a that is to be viewed by the operator.

Embodiment 1

1-1. Configuration of HDD

In the interior space of the operation housing 1, other than the central integrated circuit, the circuit board, and the battery, a lid 5 is included for lidding a storing section configured to house an HDD 7 (described later) that stores information data sent and received by the PC. Although the lid 5 is arranged on the left lateral surface 1d in the present embodiment, it may be arranged on the right lateral surface 1e or on the reverse surface 1b.

Figure 2:
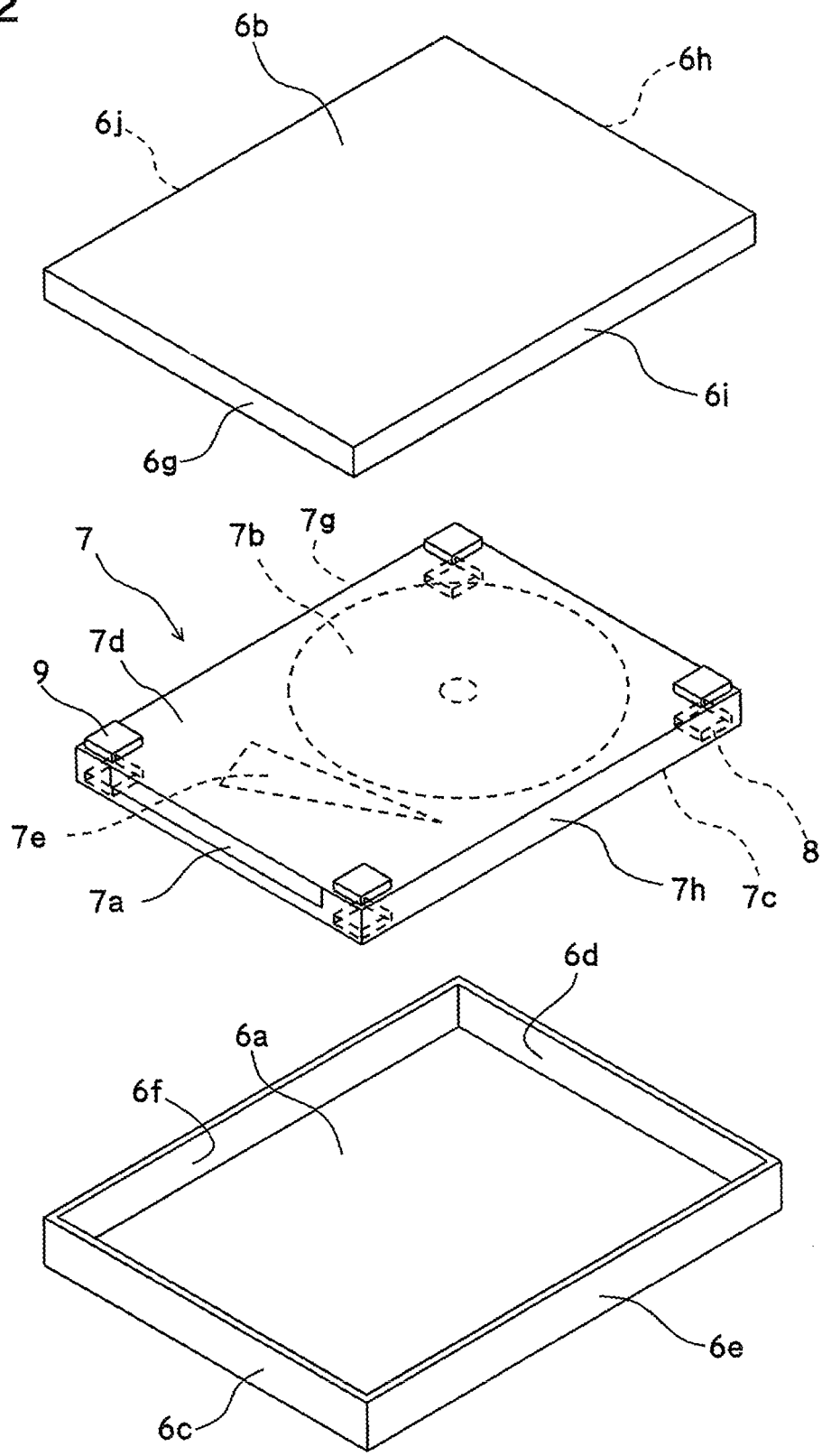
FIG. 2 is an exploded perspective view of a separate HDD that is to be built in a PC.

FIG. 2 is an exploded perspective view of a hard disk case (hereinafter, abbreviated as case) 6 that is to be housed in the storing section lidded by the lid 5. The HDD 7 includes: an electrode 7a; a storage disk (hereinafter, abbreviated as disk) 7b; a bottom surface 7c that is parallel to the disk 7b and that forms a lower housing; a top surface 7d that forms an upper housing; an opposing lateral surface 7f that opposes the electrode 7a through a read/write head 7e, the disk 7b, and the read/write head 7e; and a left lateral surface 7g and a right lateral surface 7h located respectively on the left side and the right side when viewed from the electrode 7a. The read/write head 7e built in the HDD 7 sends and receives information data with respect to the disk 7b, and transmits/receives the information data to/from the circuit board included in the interior space of the operation housing 1. For this purpose, the HDD 7 includes the electrode 7a.

The case 6 includes: a lower principal surface 6a opposing the bottom surface 7c of the HDD 7 in a planar manner; an upper principal surface 6b opposing the top surface 7d in a planar manner; a below-electrode lateral surface 6c located on a side of the electrode 7a; an opposing lower lateral surface 6d opposing the below-electrode lateral surface 6c via the HDD 7; a lower right lateral surface 6e located on the right side when viewed from the below-electrode lateral surface 6c; a lower left lateral surface 6f located on the left side when viewed from the below-electrode lateral surface 6c; an above-electrode lateral surface 6g located on a side of the electrode 7a; an opposing upper lateral surface 6h opposing the above-electrode lateral surface 6g through the HDD 7; an upper right lateral surface 6i located on the right side when viewed from the above-electrode lateral surface 6g; and an upper left lateral surface 6j located on the left side when viewed for the above-electrode lateral surface 6g. Since heat is generated when the HDD 7 is driven, a penetration hole for dissipating the generated heat may be provided on, for example, the upper principal surface 6b of the case 6. It should be noted that, since the HDD 7 sends and receives electrical signals to/from the circuit board built in the interior space of the operation housing 1 via the read/write head 7e, the HDD 7 has mounted therein a control circuit board 12 (described later) for controlling the HDD 7. Therefore, generally, the HDD 7 is housed in the case 6 that has electrical insulation properties; however, in order to further improve heat dissipation efficiency, there are cases where, for example, a metal plate such as aluminum or the like is used. In a configuration in which a metal plate is used for the case 6, an insulating member 13 (described later) having electrical insulation properties is interposed between the HDD 7 and the case 6. In the present embodiment, an acrylonitrile-styrene copolymer resin is used for the case 6.

Lower buffer materials 8 are interposed between the lower principal surface 6a of the case 6 and the bottom surface 7c of the HDD 7. The lower buffer materials 8 are arranged in the vicinity of angle parts in the HDD 7. The lower buffer materials 8 are interposed between the lower principal surface 6a of the case 6 and the bottom surface 7c of the HDD 7 to support the weight of the HDD 7. In addition, upper buffer materials 9 are interposed between the upper principal surface 6b and the top surface 7d of the HDD 7. The upper buffer materials 9 are disposed on the top surface 7d, which opposes, through the disk 7b, the bottom surface 7c having the weight of the HDD 7 applied thereon. Since the upper buffer materials 9 interposed between the upper principal surface 6b and the top surface 7d are disposed on the top surface 7d which is on the opposite side of the bottom surface 7c having the weight of the HDD 7 applied thereon, it is unlikely to have a load of the HDD 7 applied to the upper buffer materials 9 in a ordinarily usage state. Therefore, the main purpose of placing the upper buffer materials 9 is to improve adhesivity between the top surface 7d and an upper principal surface 6d when fixing the lower principal surface 6a and the upper principal surface 6b of the case 6. Thus, the upper buffer materials 9 may be formed of rectangular parallelepiped shaped second buffer materials 10 and first buffer materials 11 described later.

Figure 3:
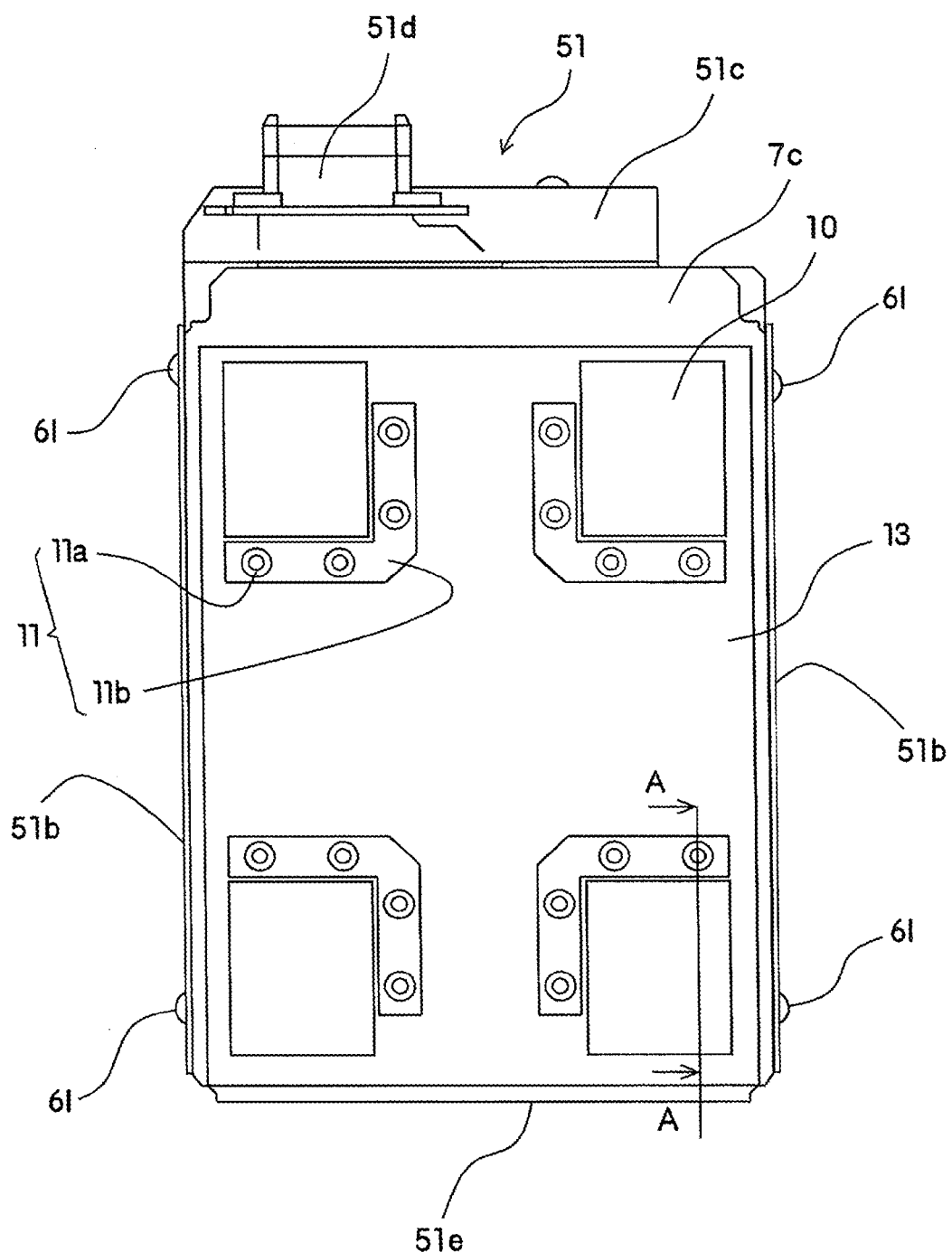
FIG. 3 is a plan view of an HDD that is to be mounted on a PC and that has another configuration having disposed therein another first buffer material and a second buffer material.
Figure 4:
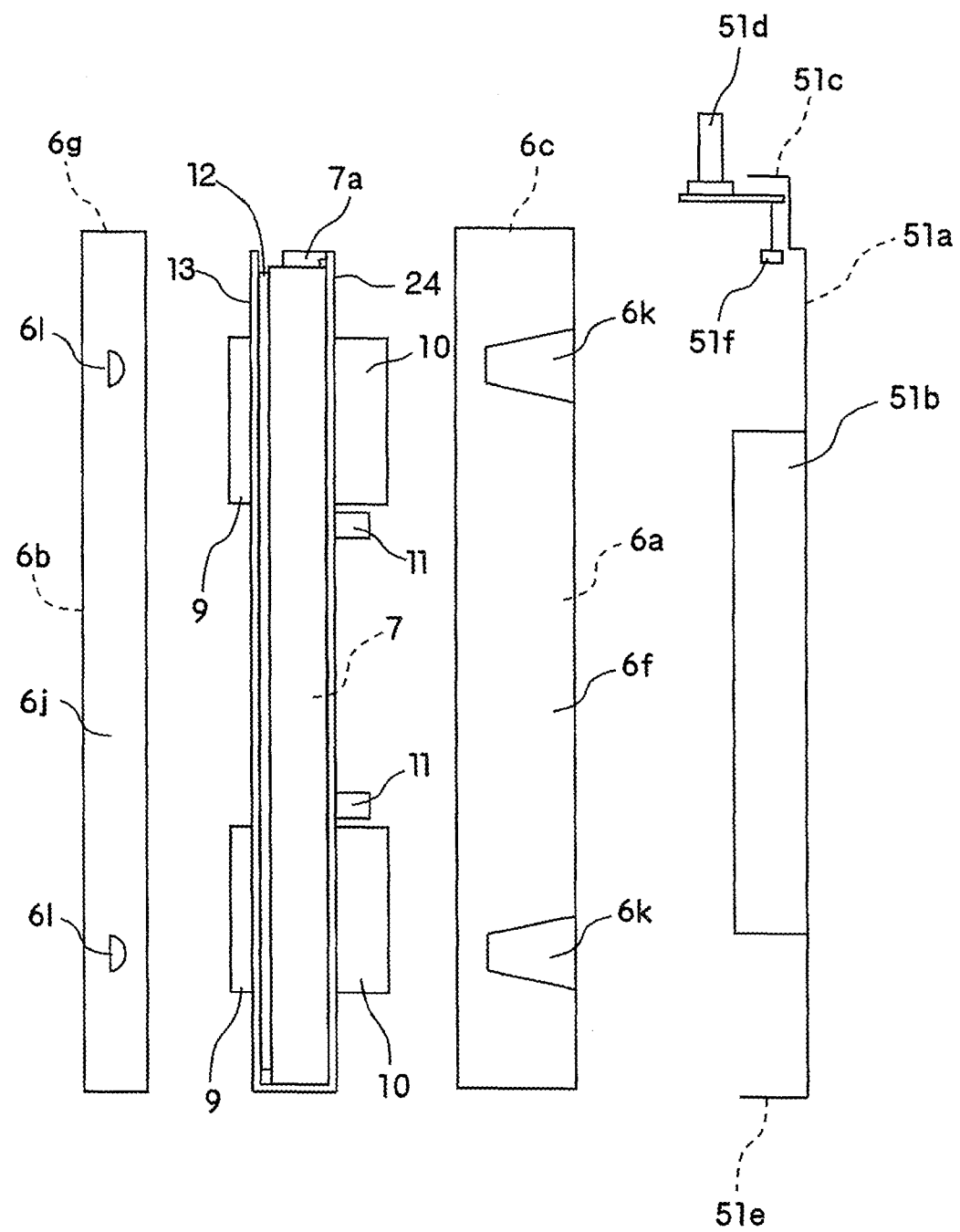
FIG. 4 is an exploded perspective view of FIG. 15.

Detailed configuration of the HDD 7 and the case 6 will be described with reference to FIG. 3 and FIG. 4. FIG. 3 is a plan view from the bottom surface 7c side of the HDD 7, and FIG. 4 is an exploded lateral view. It should be noted that, in order to avoid complication, the lower principal surface 6a of the case 6, a drive fixing part 51, and the fixing principal surface 51a described later are omitted in FIG. 3.

The HDD 7 includes the electrode 7a for sending and receiving data from/to the read/write head 7e that is built therein, the bottom surface 7c, and the top surface 7d opposing the bottom surface 7c through the disk 7b and the read/write head 7e. The control circuit board 12 for conducting controls such as rotationally driving the disk 7b housed in the HDD 7, adjusting position of the read/write head 7e with respect to the disk, etc., is integrally formed on the top surface 7d of the HDD 7. It should be noted that, although the control circuit board 12 is included on the top surface 7d side of the HDD 7 in the present embodiment, all the same effects are obtained when it is included on the bottom surface 7c. It is necessary to electrically protect the control circuit board 12 since the circuit board is laminated thereon as it is. Therefore, in the present embodiment, the upper buffer materials 9, the first buffer materials 11, and the second buffer materials 10 are pasted to the control circuit board 12 via the insulating member 13. As the insulating member 13, for example, a polyethylene terephthalate film and that like having electrical insulation properties can be used; and in the present embodiment, a polyethylene terephthalate film having a thickness of 5 μm is used.

Therefore, on the bottom surface 7c of the HDD 7, the second buffer materials 10 and the first buffer materials 11 disposed adjacent to the second buffer materials 10 are pasted on the insulating member 13 using an adhesive. On the top surface 7d of the HDD 7, the upper buffer materials 9 are pasted on the insulating member 13 using an adhesive. It should be noted that the second buffer materials 10 in the present embodiment have a shape of a rectangular parallelepiped or a cube, and in terms of their characteristics, become deformed when pressure is applied thereto until restoring force that is equivalent to the pressure is generated, and regain their original shape when the applied pressure is eliminated. In terms of their configuration, one surface of each the second buffer materials 10 is arranged so as to oppose the lower principal surface 6a side of the case 6. Each of the first buffer materials 11 (described later) are arranged parallel to each of the central-side lateral surfaces of the second buffer materials 10 on the bottom surface 7d of the HDD 7. Examples of materials used as the second buffer materials 10 include rubbers such as ethylene-propylene rubbers and fluorocarbon rubbers, foams and the like obtained by foaming urethane, polyethylene, and the like. Furthermore, instead of using the second buffer materials 10 singly, a composite buffer material may be used as the second buffer materials 10 of the present embodiment; and examples thereof include a composite buffer material of a vibration damping part and an impact-absorbing part disclosed in Japanese Laid-Open Patent Publication No. 2009-264483, a composite buffer material obtained by embedding in a flexible material a cut end face of a plate-like member disclosed in Japanese Laid-Open Patent Publication No. 2004-315087, Japanese Laid-Open Patent Publication No. 2008-291986, etc. In the present embodiment, a urethane foam having a length of 2.5 mm in the long side direction and a length of 2.2 mm in the short side direction of the HDD 7, and a height of 7.5 mm in natural length is used.

Furthermore, the first buffer materials 11 in the present embodiment include buckling parts 11a that flexuously deform when external disturbance applied to the HDD 7 or the like exceeds the impact-lessening capacity of the second buffer materials 10, and support parts 11b supporting the buckling parts 11a. In addition, the buckling parts 11a have a hollow cylindrical shape, and are attached firmly to the bottom surface 7c of the HDD 7. Therefore, external disturbance applied to the HDD 7 is conveyed to the second buffer materials 10, and excessive load that cannot be lessened and absorbed by the second buffer materials 10 buckles and deforms the buckling parts 11a of the first buffer materials 11 until restoring force that is equivalent to the load is generated through flexuous deformation. When the load is removed, they are restored to their original shape. Furthermore, the magnitude of the load for buckling the buckling parts 11a may be adjusted by the thickness thereof in a cross section in the hollow cylinder in the buckling parts 11a of the first buffer materials 11.

The first buffer materials 11 include the support parts 11b that support the buckling parts 11a from the bottom surface 7c of the HDD 7. The support parts 11b have a role in lessening damage to the bottom surface 7c of the HDD 7 by the hollow cylinder cross section of the buckling parts 11a, and also in determining positions of the buckling parts 11a with respect to the HDD 7. Therefore, the support parts 11b are formed with flat surfaces having a desired area size along the bottom surface 7c. In the present embodiment, although the support parts 11b are integrally form with the buckling parts 11a using an identical material, they may be formed as separate members. Materials that can be used for the first buffer materials 11, in particular, the buckling parts 11a include rubber materials such as natural rubbers, silicone rubbers, and styrene-butadiene based synthetic rubbers, or thermoplastic elastomers. Furthermore, when the material used for the support parts 11b and the material used for the buckling parts 11a are different, those that can be used as the support parts 11b along the bottom surface 7c include, for example, flexible materials such as polyethylene terephthalate and polyamide, and gels and plasticization resins having adhesiveness on their surfaces. It should be noted that, in the present embodiment, although two of the buckling parts 11a of the first buffer materials 11 are provided with respect to one of the second buffer material 10, they may be arranged along one lateral surface of the second buffer materials 10. Furthermore, the number of the buckling parts 11a to be arranged may be determined in accordance with the length of one lateral surface of the second buffer materials 10. In the present embodiment, two of the buckling parts 11a are arranged on the lateral surface of the second buffer materials 10, since having only one on the lateral surface may result in instability with respect to shaking or tilting motion (described later) of the HDD 7. Furthermore, as shown in FIG. 3, the second buffer materials 10 are disposed on each of the lateral surfaces that oppose each other. However, the second buffer materials 10 may be disposed on either one of the lateral surface of one pair of the second buffer materials 10 that oppose each other, or may be disposed on each of the lateral surfaces so as to surround the second buffer materials 10. In one example in the present embodiment, the buckling parts 11a that have a pillar shape with a diameter of 4 mm, a thickness of 1 mm, and a height of 4 mm from the surfaces of the support parts 11b, are arranged in a 7 mm interval. The support parts 11b have a thickness of 1 mm, and a distance of 2 mm from each of the second buffer materials 10 in a direction orthogonal to a lateral surface thereof. A silicone rubber is used as a material for both of those described above.

Therefore, a separation d is 2.5 mm between the lower principal surface 6a (the same as a side of the lower principal surface 6a of the second buffer materials 10) in FIG. 5A described later, and a surface opposing the lower principal surface 6a in the buckling parts 11a.

In order to electrically connect the electrode 7a of the HDD 7 and the circuit board of the PC, and fix the HDD 7 in the operation housing 1 of the PC, the HDD 7 having the control circuit board 12 is mounted on the drive fixing part 51. The drive fixing part 51 includes: the fixing principal surface 51a that supports the lower principal surface 6a of the case 6; one pair of fixing lateral surfaces 51b each opposing the lower left lateral surface 6f and the lower right lateral surface 6e; a connecting side lateral surface 51c on a side of the below-electrode lateral surface 6c and the above-electrode lateral surface 6g of the case 6; a connection part 51d for sending and receiving electrical signals to/from the circuit board of the PC connected on a side of the connecting side lateral surface 51c; a terminal electrode 51f for electrically connecting to the electrode 7a of the HDD 7 using, for example, flexible wiring; and an opposing lateral surface 51e that opposes and is on the opposite side of the connecting side lateral surface 51c through the fixing principal surface 51a.

It should be noted that the one pair of fixing lateral surfaces 51b of the drive fixing part 51 are each fixed to inner sides of the lower left lateral surface 6f and the lower right lateral surface 6e of the case 6. Therefore, the case 6 and the drive fixing part 51 behave integrally. In addition, one pair of engagement parts 6k are included each on the lower left lateral surface 6f and the lower right lateral surface 6e of the case 6, and engage one pair of engagement projections 6l provided each on the upper left lateral surface 6j and the upper right lateral surface 6i. The lower left lateral surface 6f and the lower right lateral surface 6e are biased so as to respectively make contact with the upper left lateral surface 6j and the upper right lateral surface 6i. Therefore, the engagement parts 6k and the engagement projections 6l can fix the case 6 housing the HDD 7, and the HDD 7 is fixed on the drive fixing part 51 via the case 6.

The electrode 7a of the HDD 7 and the circuit board of the operation housing 1 become electrically connected via the connection part 51d when the terminal electrode 51f is connected to the electrode 7a. The HDD 7 is driven on the PC when the connection part 51d is connected to a terminal formed on the circuit board or the like of the operation housing.

1-2. Buffer Configuration of HDD

Figure 5A:
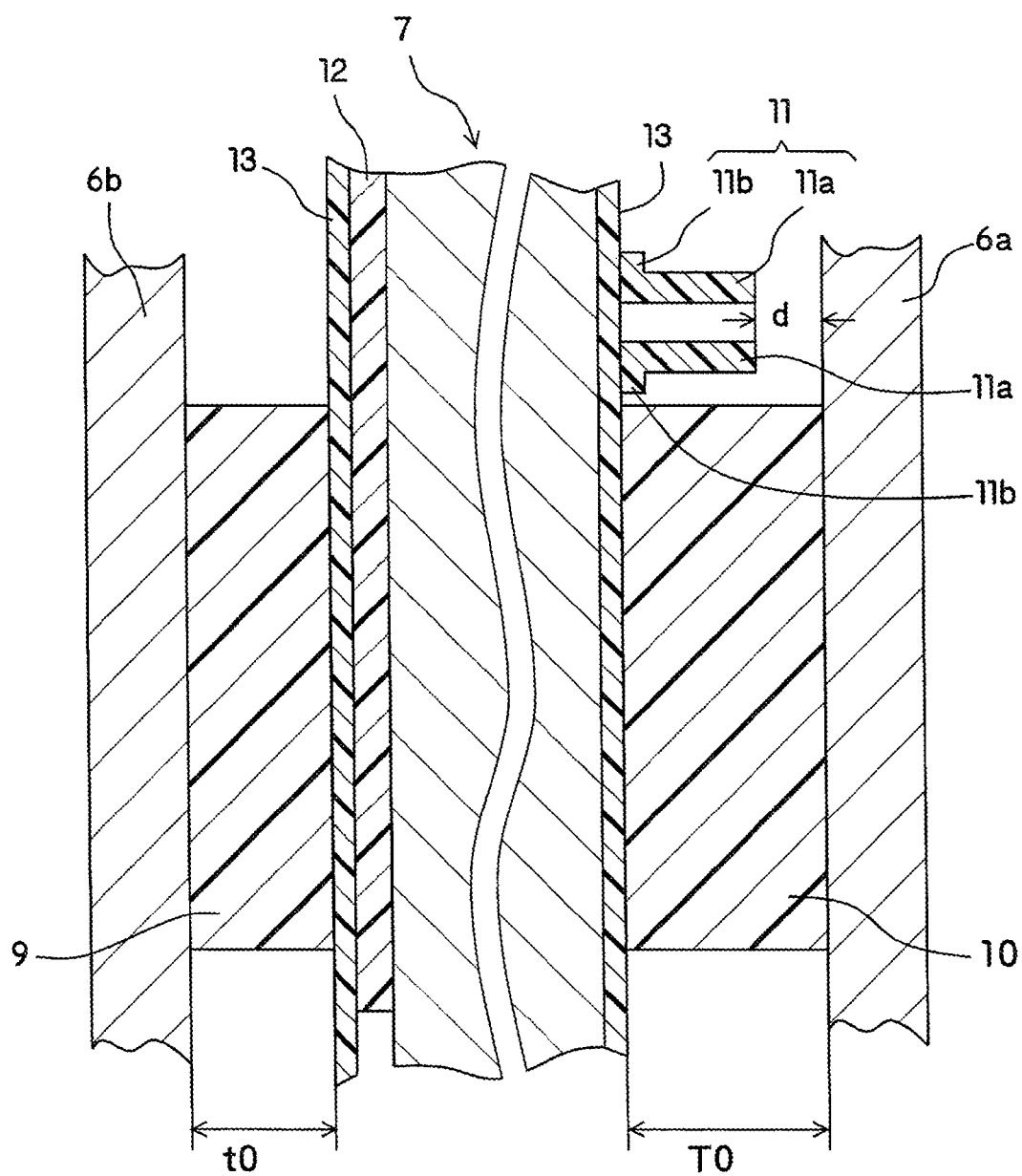
FIG. 5A is a lateral view of relevant parts of FIG. 15.
Figure 5B:
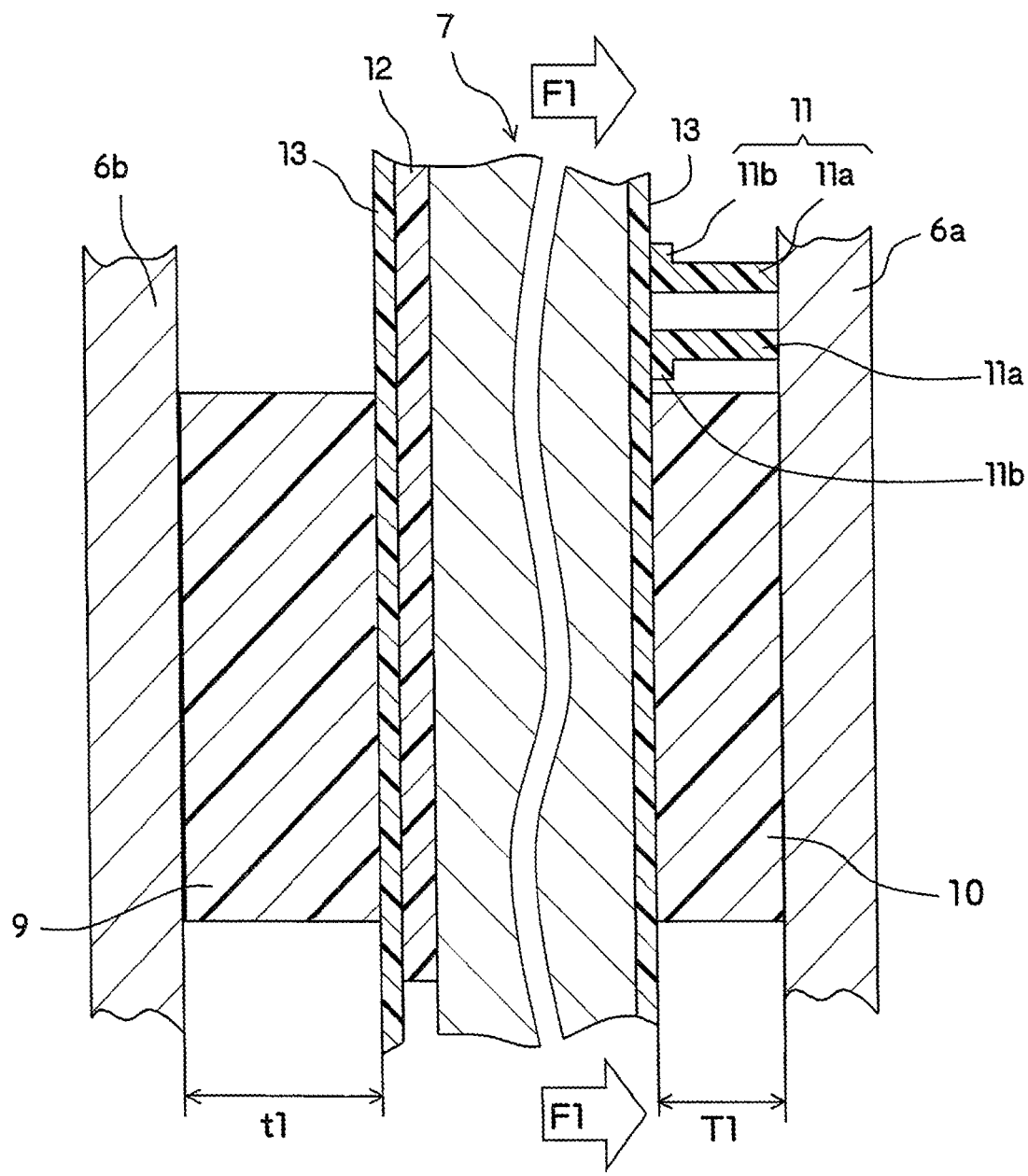
FIG. 5B is a lateral view of relevant parts of FIG. 15.
Figure 5C:
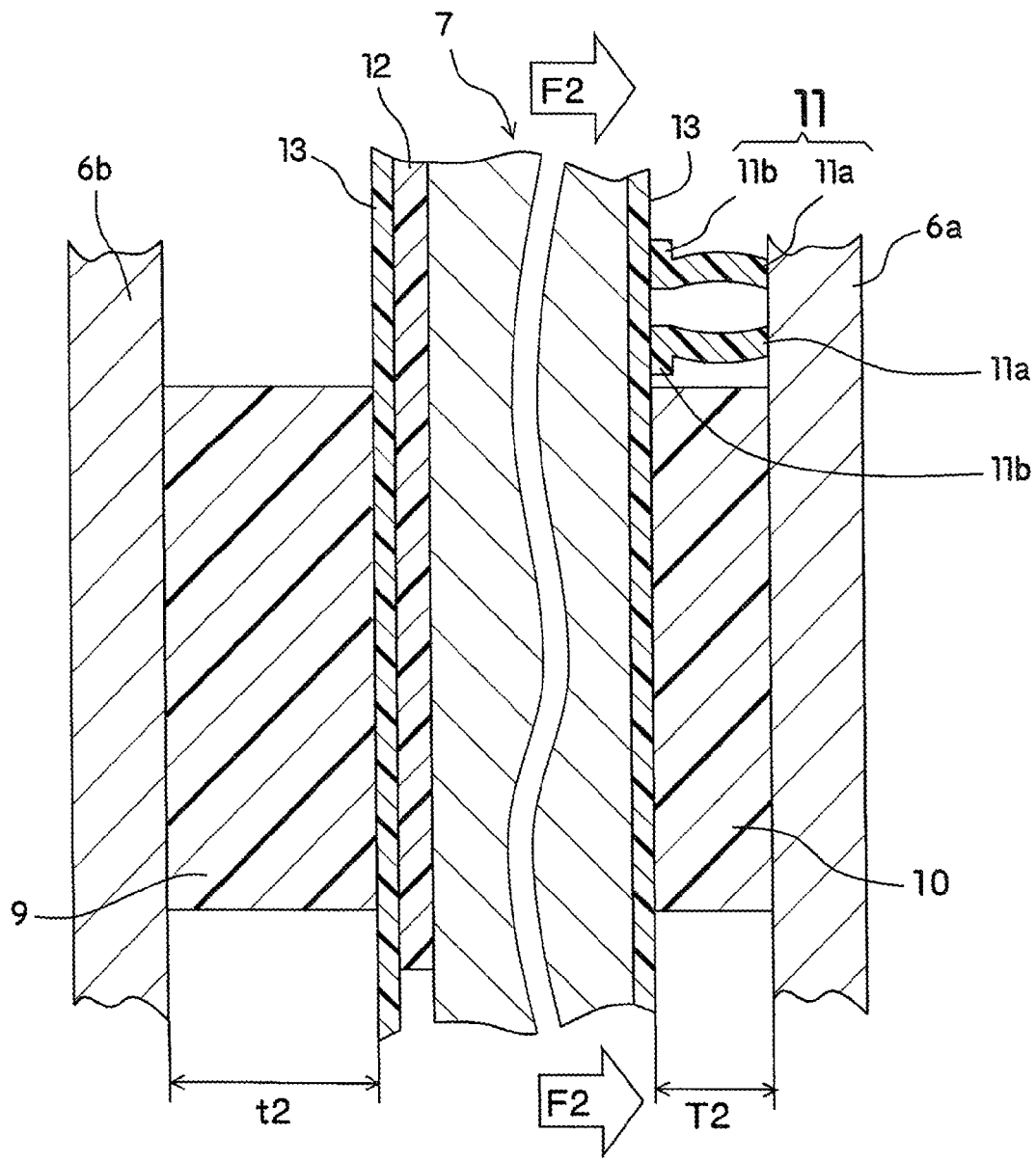
FIG. 5C is a lateral view of relevant parts of FIG. 15.

FIG. 5A, FIG. 5B, and FIG. 5C show cross-section shapes along line A-A in FIG. 3 of a buffer configuration of the HDD 7 fixed on the drive fixing part 51 as described above. More specifically, the first buffer materials 11 and the second buffer materials 10 are arranged on the bottom surface 7c of the HDD 7 via the insulating member 13. The upper buffer materials 9 are arranged on the top surface 7d of the HDD 7 via the control circuit board 12 and the insulating member 13. It should be noted that, even when an impact attributed to external disturbance is applied on the case 6, since the case 6 is fixed through engagement of the engagement parts 6k and the engagement projections 6l, the interval between the lower principal surface 6a and the upper principal surface 6b is constant. In addition, since the case 6 is fixed through engagement of the engagement parts 6k and the engagement projections 6l, the upper buffer materials 9 and the lower buffer materials 8 (the second buffer materials 10 described later) housed in the case 6 are press-fit inside the case 6.

FIG. 5A shows a state before external disturbance is applied to the case 6. The upper buffer materials 9 have a thickness t0, and the second buffer materials 10 have a thickness T0. Furthermore, the lower principal surface 6a and the buckling parts 11a of the first buffer materials 11 have a gap d. Therefore, until an impact attributed to external disturbance causes the second buffer materials 10 to contract by the gap d, the first buffer materials 11 will not be subjected to the impact. Furthermore, the thickness T0 of the second buffer materials 10 is a result of contraction of the second buffer materials 10 due to the weight of the HDD 7 and the control circuit board 12 (the weight of the insulating member 13 is at a degree that can be ignored and therefor is omitted), and pressure by the upper buffer materials 9. The thickness t0 of the upper buffer material 9 is a result of compression thereof due to pressure of the second buffer materials 10 and the weight of the HDD 7 and the control circuit board 12.

FIG. 5B shows a moment when external disturbance is applied to the case 6 and when an impact F1 attributed to this external disturbance is applied. As a result of the applied impact F1, the second buffer materials 10 contract as much as the gap d to have a distance T1, and the upper buffer materials 9 balance at a thickness t1. Therefore, the buckling parts 11a of the first buffer materials 11 do not buckle with the impact F1 or less. Furthermore, t1-t0=T0-T1 is satisfied since the interval between the lower principal surface 6a and the upper principal surface 6b is constant, and the thicknesses of the HDD 7, the control circuit board 12, and the insulating member 13 do not vary. Therefore, the buckling parts 11a will not buckle against an impact that is applied to the HDD 7 and is equal to or below a predetermined value (F1 in the present embodiment).

At this state, when an impact F2 that is stronger than the force at which the buckling parts 11a of the first buffer materials 11 buckle is applied to the HDD 7; as shown in FIG. 5C, the second buffer materials 10 and the buckling parts 11a contract from a thickness of T1 to T2 in response to the impact F2, and the buckling parts 11a buckle (flexuously deform). Simultaneously, the upper buffer materials 9 become restored by a thickness (T1-T2) and stretched. In other words, the buckling parts 11a of the first buffer materials 11 buckle against a force that is larger than an impact F1, which is the predetermined value for the HDD 7. In the manner described above, an impact (F2-F1) to the HDD 7 is lessened by the second buffer materials 10, the first buffer materials 11, and the upper buffer materials 9.

Furthermore, the buckling phenomenon of the buckling parts 11a is, as shown in FIG. 5C as an example, flexuous deformation while maintaining restorability of the buckling parts 11a of the first buffer materials 11. At this moment, by having the lower principal surface 6a of the case 6 block end surfaces of the buckling parts 11a on the side of the lower principal surface 6a, hollow portions of the buckling parts 11a are closed and the buckling parts 11a elastically deform in a drum shape. Therefore, deformation of the buckling parts 11a occurs symmetrically with respect to the center line in stand directions of the buckling parts 11a, and the bend directions of the buckling parts 11a in response to the application of the impact F2 are all consistently in the same direction as those in each of the buckling parts 11a. In addition, air stored in the hollow portions enables restorable contraction, and this air facilitates restorability of the buckling parts 11a. Furthermore, by disposing two first buffer materials 11 on a single lateral surface of the second buffer materials 10, averaged restoring force can be provided with respect to, for example, tilting and shaking of the HDD 7. Thus, load applied to the first buffer materials 11 can be lessened by the bend motion. By having the buckling parts 11a randomly deform in the surface direction depending on their arrangement positions, for example, tilting and shaking generated due to impact applied to the HDD 7 can be suppressed. It should be noted that, since the buckled buckling parts 11a have restorability, when the applied impact F2 is removed, the buckling parts 11a take the form shown in FIG. 5C beyond the impact F1, the form shown in FIG. 5B at the impact F1, and are restored as shown in FIG. 5A with an impact smaller than the impact F1. In addition, when repetitive vibration is generated due to external disturbance, an impact can be lessened by repeating the states shown in FIG. 5A, FIG. 5B, and FIG. 5C.

The support parts 11b can lessen contact to the bottom surface 7c of the HDD 7 through a columnar cross-sectional area. Furthermore, the support parts 11b can follow along the outer surface of the bottom surface 7c with certainty. As a result, it is possible to determine positions of the buckling parts 11a with respect to the HDD 7, prevent damage to the HDD 7, and achieve certain support by the buckling parts 11a. Furthermore, by using a configuration in which the support parts 11b are disposed on the contact surface of the buckling parts 11a and the lower principal surface 6a of the case 6, air contained in the hollow portion in FIG. 5C is enclosed with certainty, and flexibility and restorability of the buckling parts 11a are further improved. In addition, since the present embodiment has a configuration in which the hollow parts of the buckling parts 11a are also formed in the support parts 11b, buckle deformation of the buckling parts 11a can be caused also in the support parts 11b.

It should be noted that, in the present embodiment, it has been described that the thickness T2, which is obtained when the impact F2 is applied to cause compression of the second buffer materials 10 and buckling of the first buffer materials 11, is inside the restoring range of the upper buffer materials 9. However, when the thickness T2 exceeds a restoration limit of the upper buffer materials 9, the upper buffer materials 9 become detached at an interface with either the insulating member 13 or the upper principal surface 6b. It should be noted that, in the present embodiment, since the upper buffer materials 9 are adhered to the insulating member 13 on the top surface 7d side of the HDD 7, they become detached at an interface with the upper principal surface 6b.

Figure 6:
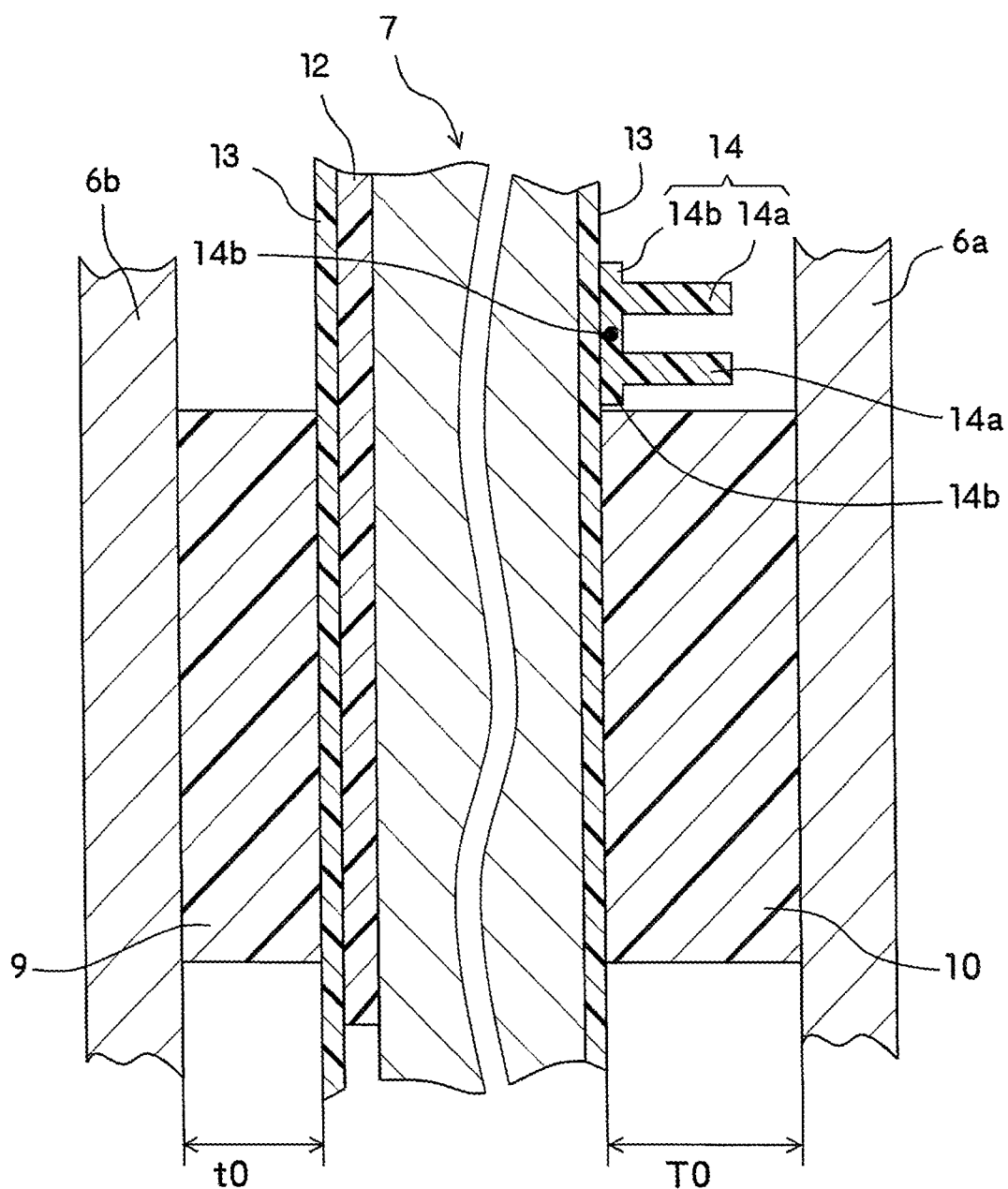
FIG. 6 is a lateral view of a state in which another first buffer material and a second buffer material are mounted on an HDD.

Furthermore, it has been described that the first buffer materials 11 are hollow up to the support parts 11b in a manner identical to the buckling parts 11a. However, as shown in FIG. 6, buckling parts 14a may be provided so as to stand with respect to plate-like support parts 14b. That is, the buckling parts 14a are formed to be hollow.

1-3. Configuration of HDD

Figure 7:
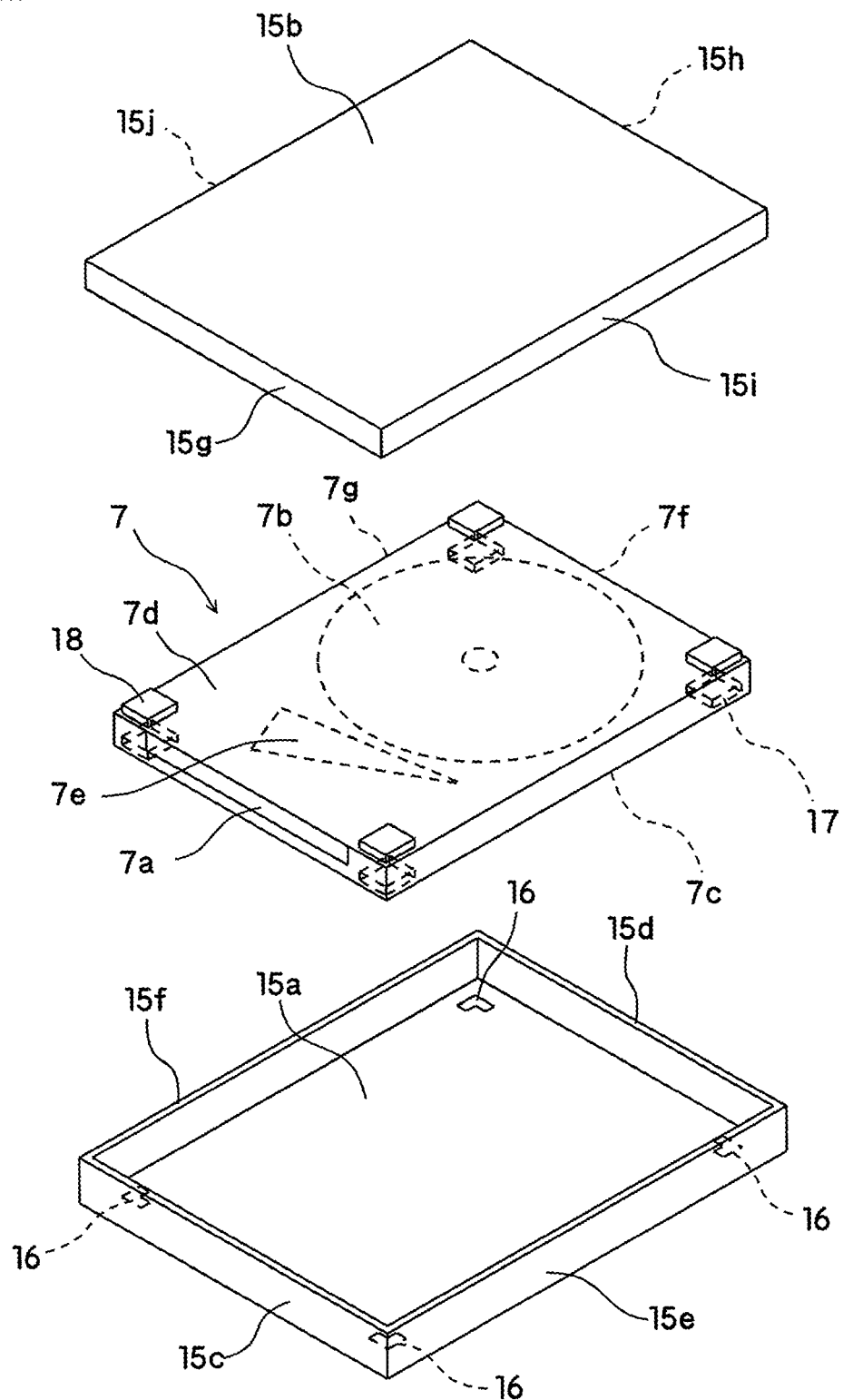
FIG. 7 is an exploded perspective view of another HDD that is to be built in a PC.

FIG. 7 is an exploded perspective view showing an outline configuration of a case 15 for housing the HDD 7. Description for the configuration of the HDD 7 is omitted since it is identical to that described above.

On the HDD 7, upper buffer materials 18 are pasted on the top surface 7d using an adhesive, and lower buffer materials 17 are pasted on the bottom surface 7c using an adhesive. More specifically, the lower buffer materials 17 are identical to as those in the previously described embodiment with regard to being formed from the first buffer materials 11 and the second buffer materials 10. It should be noted that the above described HDD 7 is one example, and all the same effects are obtained when, for example, the control circuit board 12 and the insulating member 13 are included, or when the upper buffer materials 18 are not included. Furthermore, the materials and configuration for the lower buffer materials 17 and the upper buffer materials 18 are all identical to those in the previous embodiment, and descriptions thereof are omitted.

The hard disk case 15 for housing the HDD 7 includes: an upper principal surface 15b for housing the HDD 7 from above; an above-electrode lateral surface 15g located on a side of the electrode 7a of the HDD 7; an upper opposing lateral surface 15h that opposes the above-electrode lateral surface 15g through the upper principal surface 15b; an upper right lateral surface 15i and an upper left lateral surface 15j located respectively on the right side and the left side when viewed from the above-electrode lateral surface 15g; a lower principal surface 15a for housing the HDD 7 for below; a below-electrode lateral surface 15c located on a side of the electrode 7a of the HDD 7; a lower opposing lateral surface 15d that opposes the below-electrode lateral surface 15c through the lower principal surface 15a; and a lower right lateral surface 15e and a lower left lateral surface 15f located respectively on the right side and the left side when viewed from the below-electrode lateral surface 15c. In addition, in the vicinity of all four corners of the lower principal surface 15a of the case 15, slit openings 16 are formed such that each of them are connected at an angle part along two lateral surfaces forming each of the four corners of the lower principal surface 15a.

1-4. Buffer Configuration 2 of HDD

Figure 8:
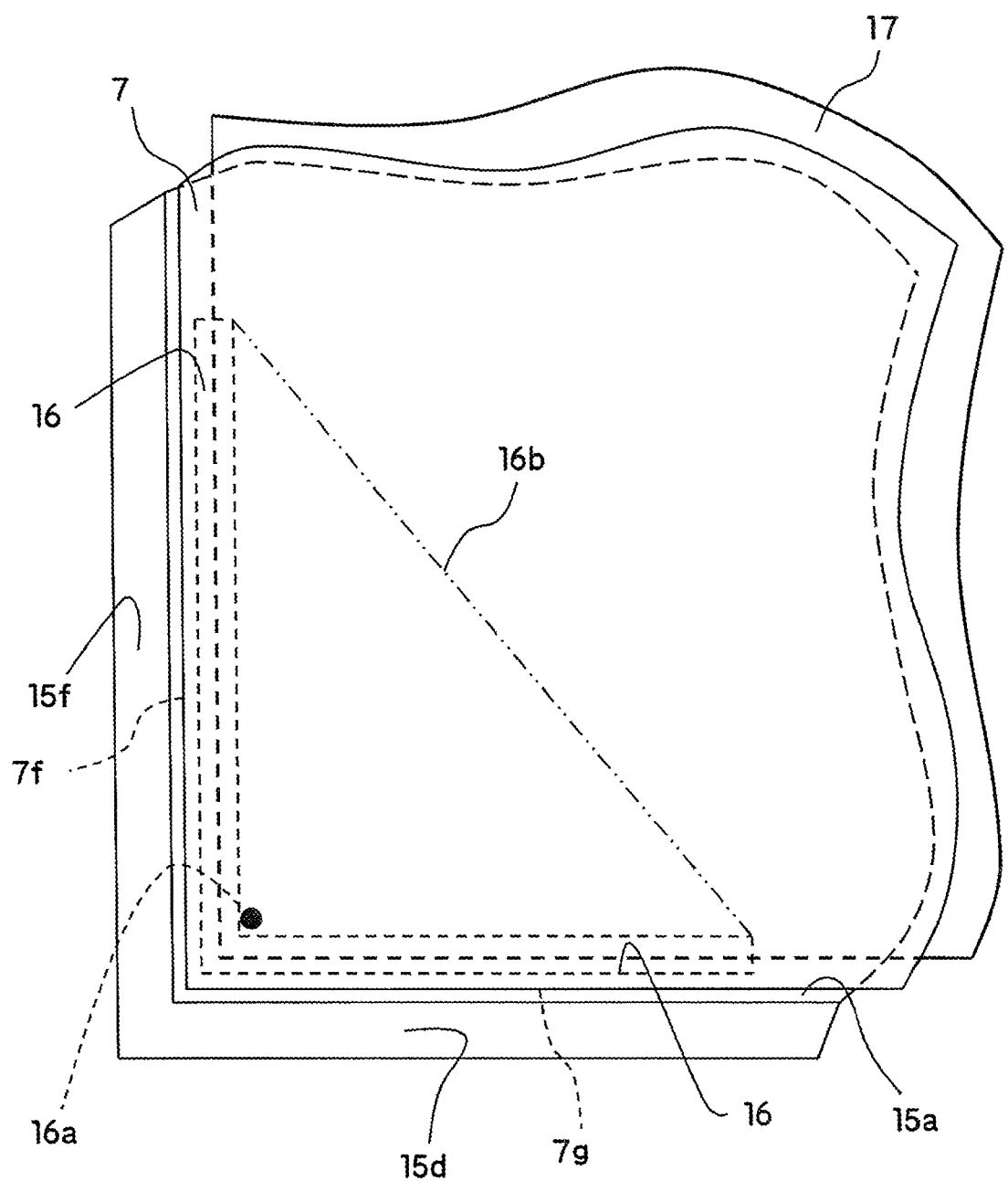
FIG. 8 is a plan view of positional relationship between an HDD and a hard disk case.

FIG. 8 is a partial plan view of the bottom side viewed from the top surface 7d of the HDD 7 in a state where the HDD 7 is placed on the lower principal surface 15a configured as described above. With regard to the slit openings 16 formed on the lower principal surface 15a, one of the slit openings 16 formed at an angle part formed by the lower opposing lateral surface 15d and the lower left lateral surface 15f is used as one example.

The lower principal surface 15a of the case 15 is made of an acrylonitrile-styrene copolymer resin having flexibility. Therefore, an angle part 16a of one of the slit opening 16 formed on the lower principal surface 15a elastically bends up and down using, as a center line, an axis 16b connecting an end portion of one of the slit openings 16 formed along the lower opposing lateral surface 15d and an end portion of one of the slit openings 16 formed on the lower lateral surface 15f. The material of the case 15 preferably has flexibility, and acrylonitrile-styrene copolymer resins and acrylonitrile-butadiene-styrene copolymer resins can be used as the material. It is also possible to use a metallic material as the material of the case 15.

The opposing lateral surface 7f of the HDD 7 is disposed between the lower opposing lateral surface 15d and an outer cut side formed by the slit opening 16 on the lower opposing lateral surface 15d side, and the left lateral surface 7g of the HDD 7 is disposed between the lower lateral surface 15f and an outer cut side form by the slit opening 16 on the other lower lateral surface 15f side. Furthermore, two lateral surfaces of one of the lower buffer materials 17 adhered to the bottom surface 7c of the HDD 7 are each arranged approximately at the center of one of the slit openings 16. Since the two lateral surface of one of the lower buffer materials 17 are arranged toward the center of the HDD 7 from the opposing lateral surface 7f and the left lateral surface 7g of the HDD 7; impact applied to the HDD 7 can be lessened through bending of the angle part 16a using the axis 16b as a center in addition to impact-lessening by the lower buffer materials 17 and the upper buffer materials 18. Thus, by forming the slit openings 16 in the vicinity of the angle parts of the lower principal surface 15a, impact generated by load applied to the HDD 7 can be lessened.

1-5. Advantageous Effects Etc.

With the configuration of having the buckling parts 11a of the first buffer materials 11 and the second buffer materials 10 disposed in the HDD 7, it is possible to lessen, by the above described action, impact generated by external disturbance in the perpendicular direction with respect to the HDD 7 housed between the lower principal surface 6a and the upper principal surface 6b of the case 6. External disturbance is not always limited only to those in the perpendicular direction, and tilting components and/or shaking components acting in directions of the bottom surface 7c of the top surface 7d of the HDD 7 are also generated. As described above, since the buckling parts 11a have a hollow cylinder column shape, even against tilting components and/or shaking components, it is possible to lessening their impact through a cooperation of the buckling parts 11a and the hollow parts included in the buckling parts 11a, and improve the advantageous effect of lessening tilting motion and/or shaking motion of the HDD 7. Furthermore, by providing the support parts 11b at interfaces between the buckling parts 11a and the HDD 7, it is possible to install with further certainty the buckling parts 11a of the first buffer materials 11 with respect to the HDD 7, and improve buffering effect against external disturbance in, for example, directions perpendicular and/or parallel to the bottom surface 7c of the HDD 7.

Furthermore, as described above, the impact F1 applied to the HDD 7 is buffered by contraction of only the second buffer materials 10, and when the impact F2 that is larger than F1 is applied to the HDD 7, an impact attributed to load (F2−F1) is lessened by the first buffer materials 11 and the second buffer materials 10. Load applied to the HDD 7 can be lessened with a configuration in which the buckling parts 11a of the first buffer materials 11 inside the case 6 are protruded from the second buffer materials 10 by a length of d (in the present embodiment, 2.5 mm) More specifically, with the configuration of the present embodiment, the first buffer materials 11 do not buckle when the impact F1 is applied, and impact is lessened only through contraction of the second buffer materials 10. When the impact F2 that can buckle the buckling parts 11a is applied after the impact F1 is applied, impact from the load difference can be buffered since, due to the load difference (F2−F1), the buckling parts 11a buckle and the thickness of the second buffer materials 10 is reduced to T2 through contraction. On the other hand, with a configuration in which the buckling parts 11a of the first buffer materials 11 protrude from the second buffer materials 10, even when the buckling parts 11a make contact with the HDD 7 after the impact F1 is applied, impact-buffering cannot be achieved with respect to the impact F1 since the buckling parts 11a and the HDD 7 are in contact with each other in a rigid-body state. In other words, since the HDD 7 makes contact with the buckling parts 11a as a rigid body until the impact F2 that causes the buckling parts 11a to buckle is applied, a reaction force with respect to the load applied to the HDD 7 until at least the impact F2 is applied is directly applied as an impact. Therefore, in order to lessen impact that is based on load applied to the HDD 7, the second buffer materials 10 protrude equal to or more than the buckling parts 11a of the first buffer materials 11. It should be noted that when the height of the buckling parts 11a and the height of the second buffer materials 10 are identical (i.e., d=0), impact buffering effect by only the second buffer materials 10 with respect to the impact F1 disappears, but, for example it effectively functions when load fluctuation (F2−F1) is small. Furthermore, load that is to be applied to the HDD, or the length of gap d can be set as appropriate in accordance with and the weight of the HDD 7 and impact absorption nature of the first buffer materials 11 and the second buffer materials 10. Thus, the length d of 2.5 mm used in the present embodiment is merely one example and is not absolute.

Although the buckling parts 11a having a hollow cylinder shape have been described in relation to the first buffer materials 11, the shape is not limited to those having a circular cross-sectional shape cut by a surface parallel to the bottom surface 7c of the HDD 7, and the shape may be a polygonal shape. It is also possible to have a shape with a narrow part in the direction perpendicularly intersecting the bottom surface 7c (e.g., a bottle gourd shape whose both end portions are cut by one pair of flat surfaces, a half body obtained by cut this bottle gourd shape a its narrow part, etc.). A circular cross-sectional shape allows exerting approximately equal buffering effect against external disturbance from 360 degree directions. In addition, since open end portions of the hollow buckling parts 11a are sealed by the lower principal surface 6a, a hemisphere form or a dome shape can also be used as the shape of the buckling parts 11a. Furthermore, since the hollow form is not necessary when it is unnecessary to specify the bend directions of the buckling parts 11a, the first buffer materials 11 may be formed to their centers with the same material. Furthermore, it is possible to isotropically embrace directions of vibration applied to the first buffer materials 11 when the outer shape of the first buffer materials 11 has, for example, a circular curved surface such as spherical, hemisphere form, spheroid body, hemi-spheroid body, etc.

Although the support parts 11b of the first buffer materials 11 are hollow in a manner similar to the buckling parts 11a in the present embodiment, it is also possible to completely fill the hollow portions of the buckling parts 14a at the positions of the support parts 14b as shown first buffer materials 14 in FIG. 6, or have the hollow portion at parts of the support parts 14b inside the buckling parts 14a. This modification of the first buffer materials 14 can be freely applied on manufacturing surfaces of the first buffer materials 11 or 14.

Furthermore, since the HDD 7 has the slit openings 16 formed on the angle parts of the lower principal surface 15a of the case 15, the angle parts 16a of the slit openings 16 are shaken up and down using the axes 16b as a center. Therefore, impact with respect to the HDD 7 disposed on the lower principal surface 15a can be lessened through elastic deformation of the angle parts 16a. In addition, since impact-lessening by the angle parts 16a assists the impact buffering effect by the lower buffer materials 17, impact buffering effect obtained by the usage of the first buffer materials and the second buffer materials for the lower buffer materials 17 can be further improved. Furthermore, the lower buffer materials 17 can be exposed from the slit openings 16 easily due to pressure on the HDD 7 caused by the usage of the upper buffer materials 18, and elastic deformation of the slit openings 16 can be provided to the lower buffer materials 17 to further improve the impact buffering effect.

Embodiment 2

2-1. Configuration of HDD

Figure 9:
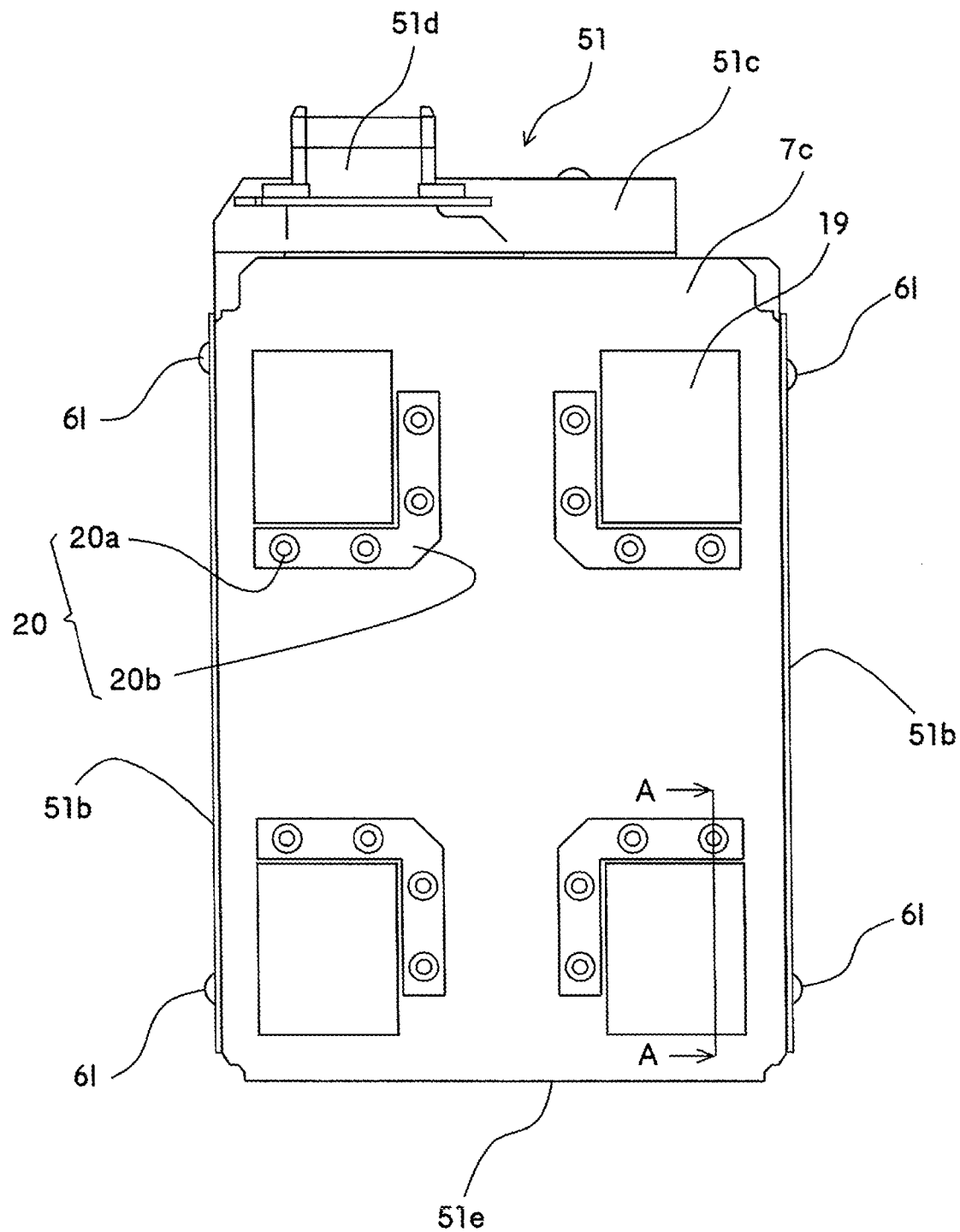
FIG. 9 is a plan view in which an HDD having disposed therein another first buffer material and a second buffer material is mounted on a PC.
Figure 10:
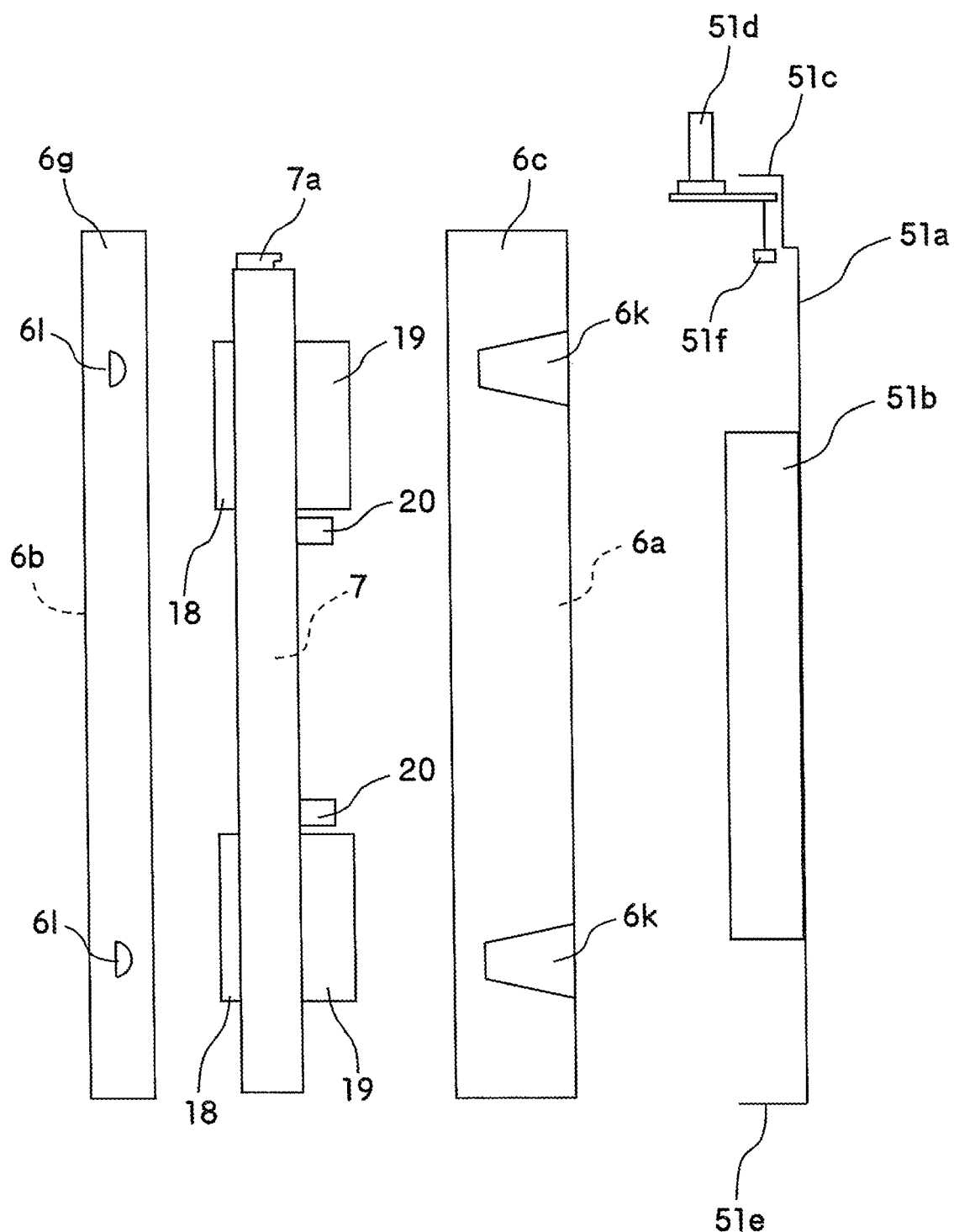
FIG. 10 is an exploded perspective view of FIG. 12.

FIG. 9 is a front view of the HDD 7, and FIG. 10 is an exploded lateral view of FIG. 9. It should be noted that configurations of the HDD 7, the case 6, and the drive fixing part 51 are identical to those described with reference to FIG. 3 and FIG. 4, and descriptions of those are omitted.

Here, the control circuit board 12 is not included since controls of rotation of the disk 7b of the HDD 7 and position of the read/write head 7e are conducted by the PC, and therefore the insulating member 13 is unnecessary. Therefore, upper buffer materials 18, second buffer materials 19, and first buffer materials 20 are pasted directly on the top surface 7d and the bottom surface 7a of the HDD 7.

2-2. Buffer Configuration of HDD

Figure 11:
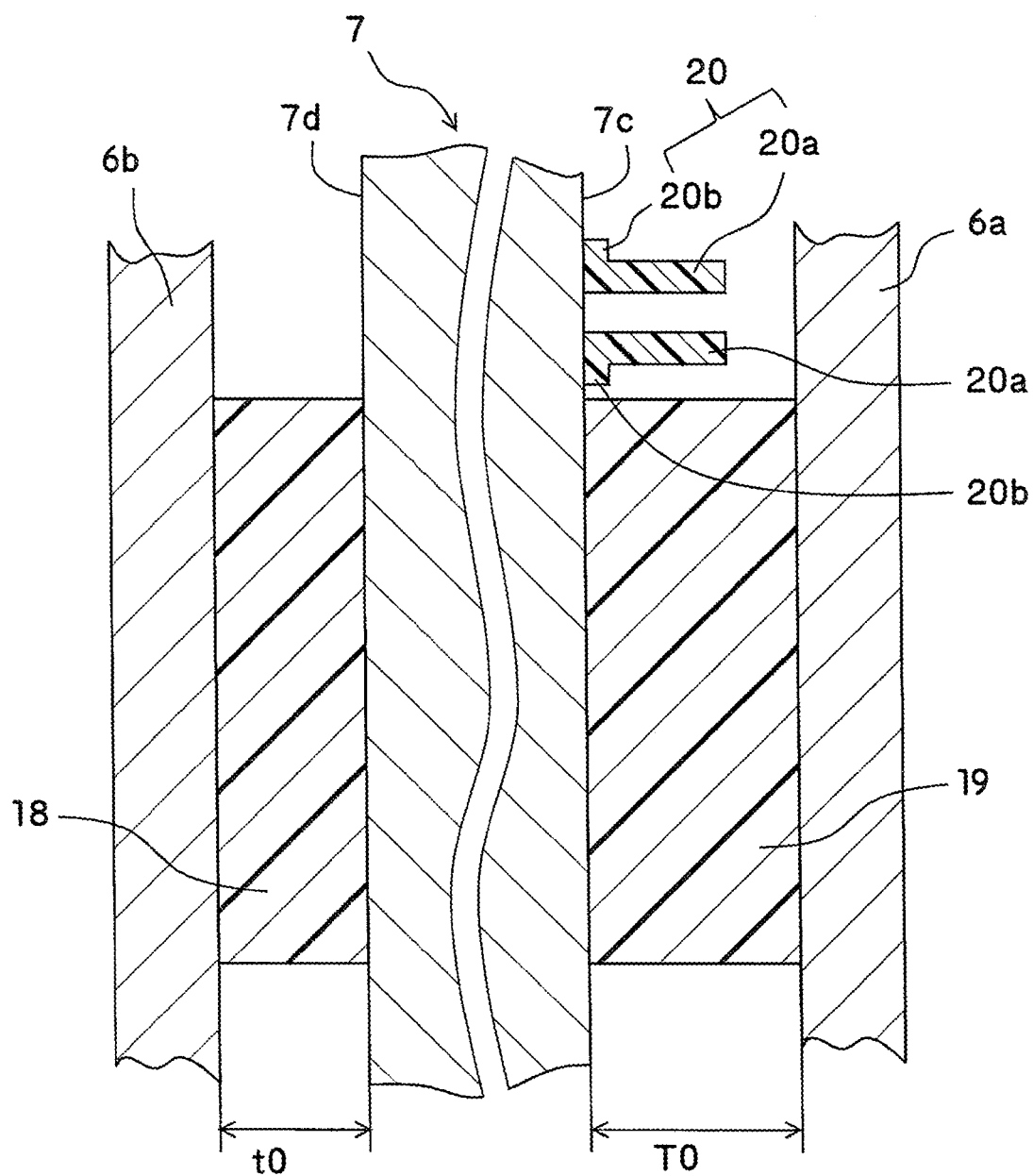
FIG. 11 is a lateral view of relevant parts of FIG. 12.

FIG. 11 shows cross-sectional view of lateral surfaces of relevant parts of the HDD 7 housed in the case 6. Although reference characters are changed for the upper buffer materials 18 pasted on the top surface 7d, and the second buffer materials 19 and the first buffer materials 20 pasted on the bottom surface 7c of the HDD 7, since they are not pasted on the insulating member 13; the material and arrangement relationship of them are identical to those above.

Therefore, the same behavior described with reference to FIG. 5A, FIG. 5B, and FIG. 5C is exhibited in response to an impact applied to the HDD 7 in association with external disturbance. Therefore, even with a configuration in which the control circuit board 12 and the insulating member 13 are not included, the buffering effect with respect to an impact is similar to that described above.

2-3. Configuration of HDD

Figure 12:
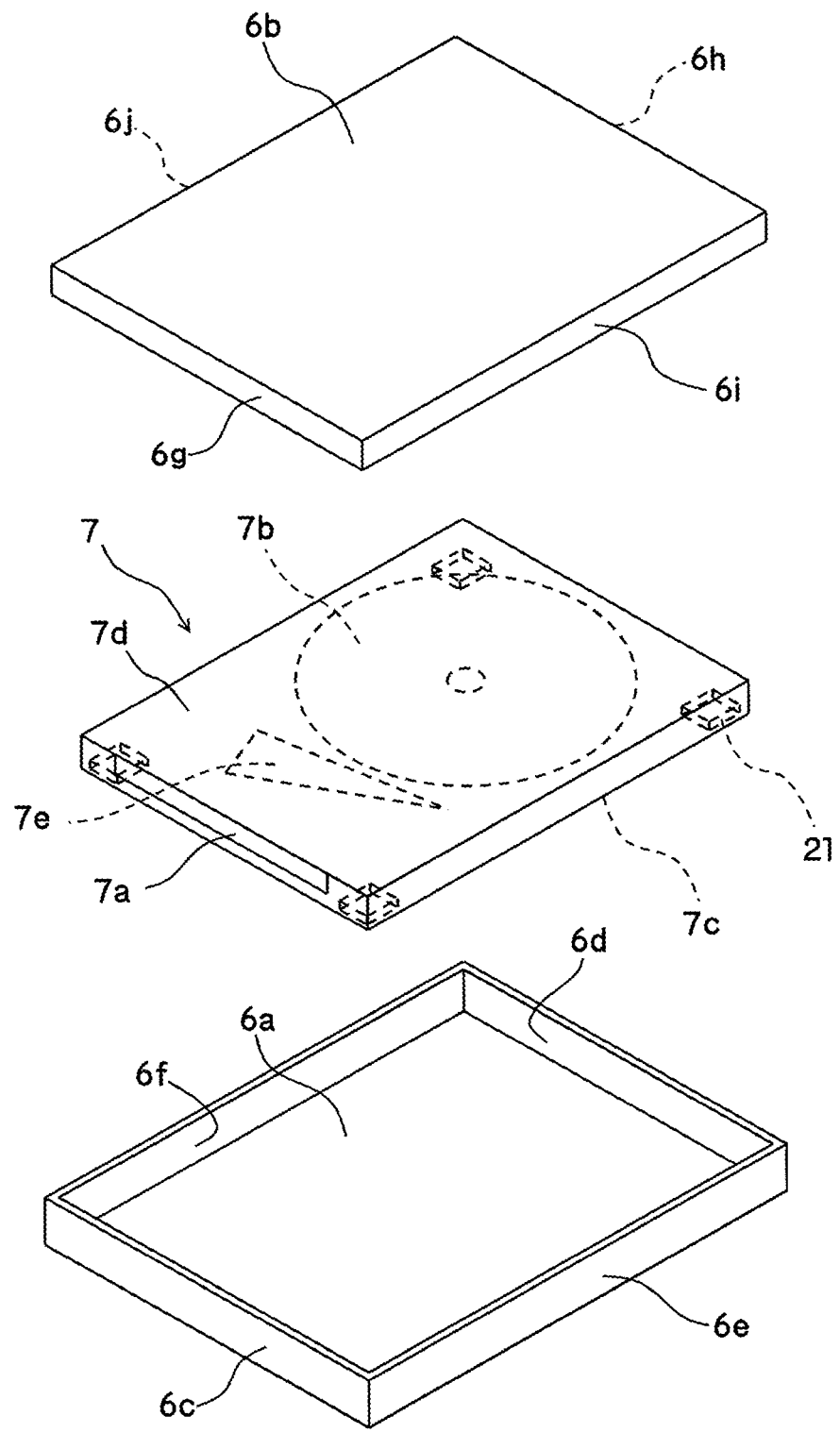
FIG. 12 is an exploded perspective view of another HDD that is to be built in a PC.

FIG. 12 is an exploded perspective view of a hard disk case that is to be built in a PC. The configuration of the case 6 and the HDD 7 in the present embodiment is similar to that in the previous embodiment, and descriptions thereof are omitted. However, in the present embodiment, a HDD 7 only having lower buffer materials 21 is housed in the case 6. Thus in the HDD 7 housed in the case 6, the lower buffer materials 21 exist between the lower principal surface 6a of the case 6 and the bottom surface 7c of the HDD 7, and the top surface 7d of the HDD 7 is directly making surface contact with the upper principal surface 6b of the case 6.

2-4. Buffer Configuration of HDD

Figure 13A:
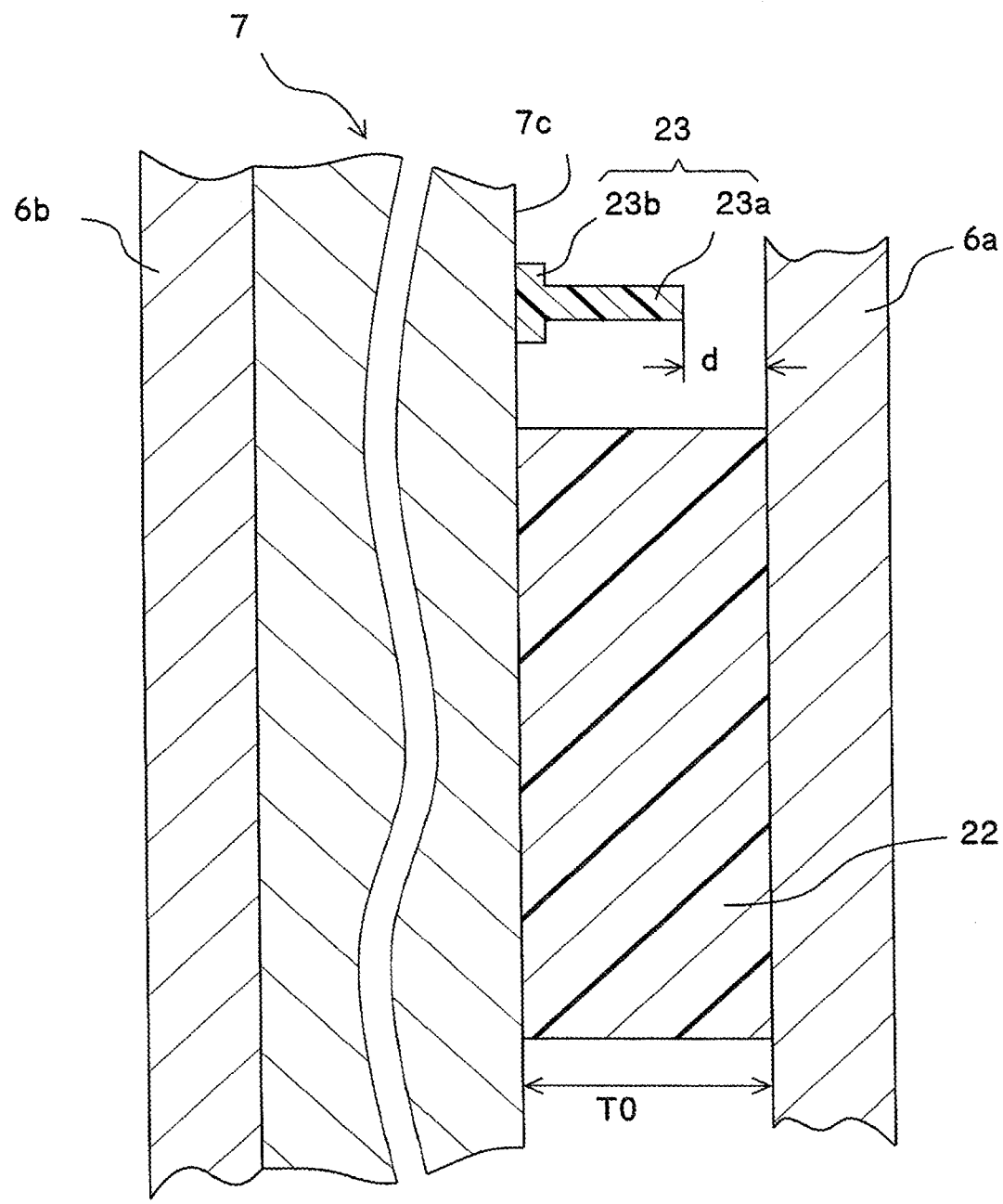
FIG. 13A is a lateral view of a state in which pressure is not applied on another first buffer material and a second buffer material.
Figure 13B:
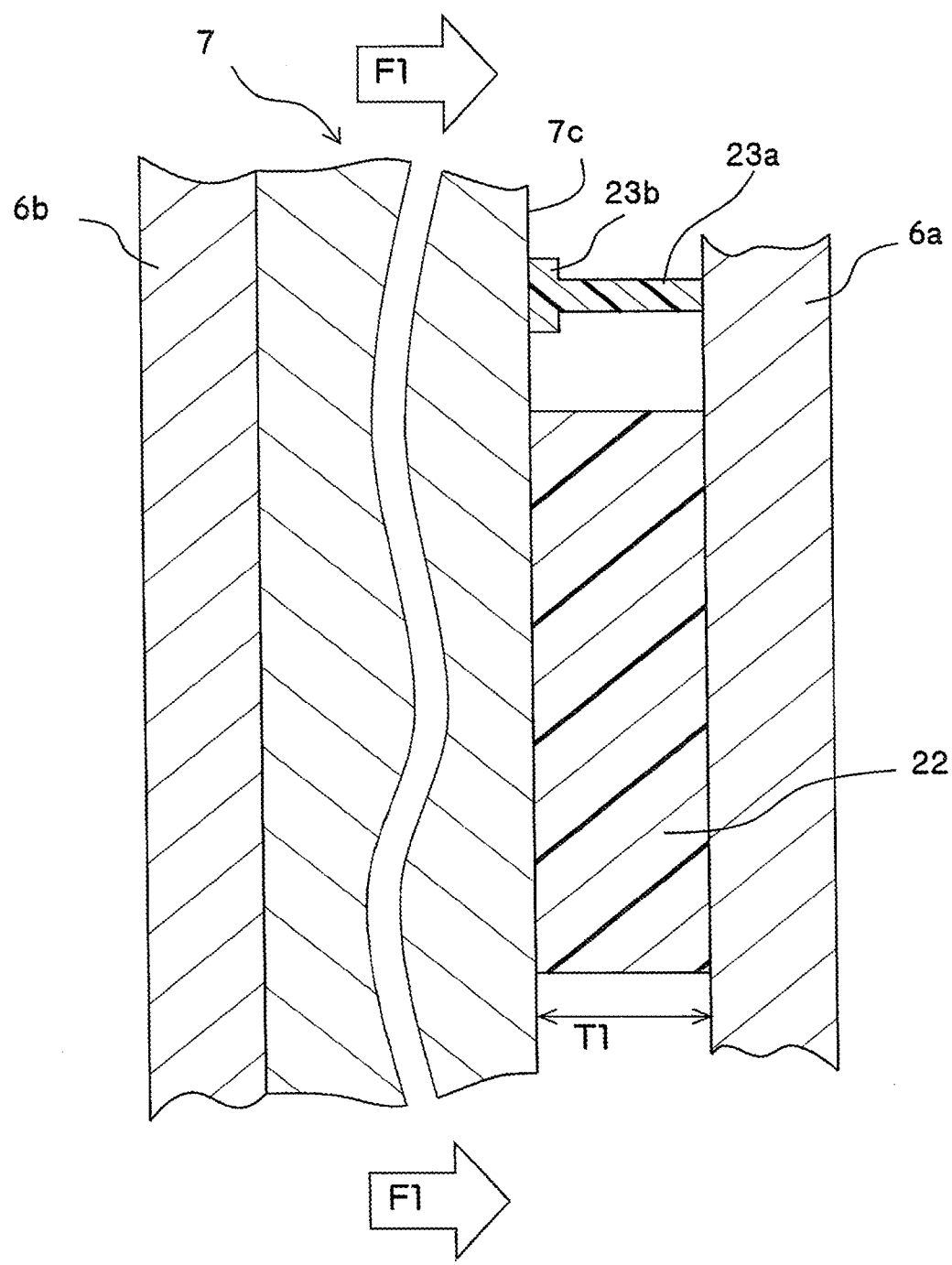
FIG. 13B is a lateral view of a state in which pressure is not applied to the first buffer material.
Figure 13C:
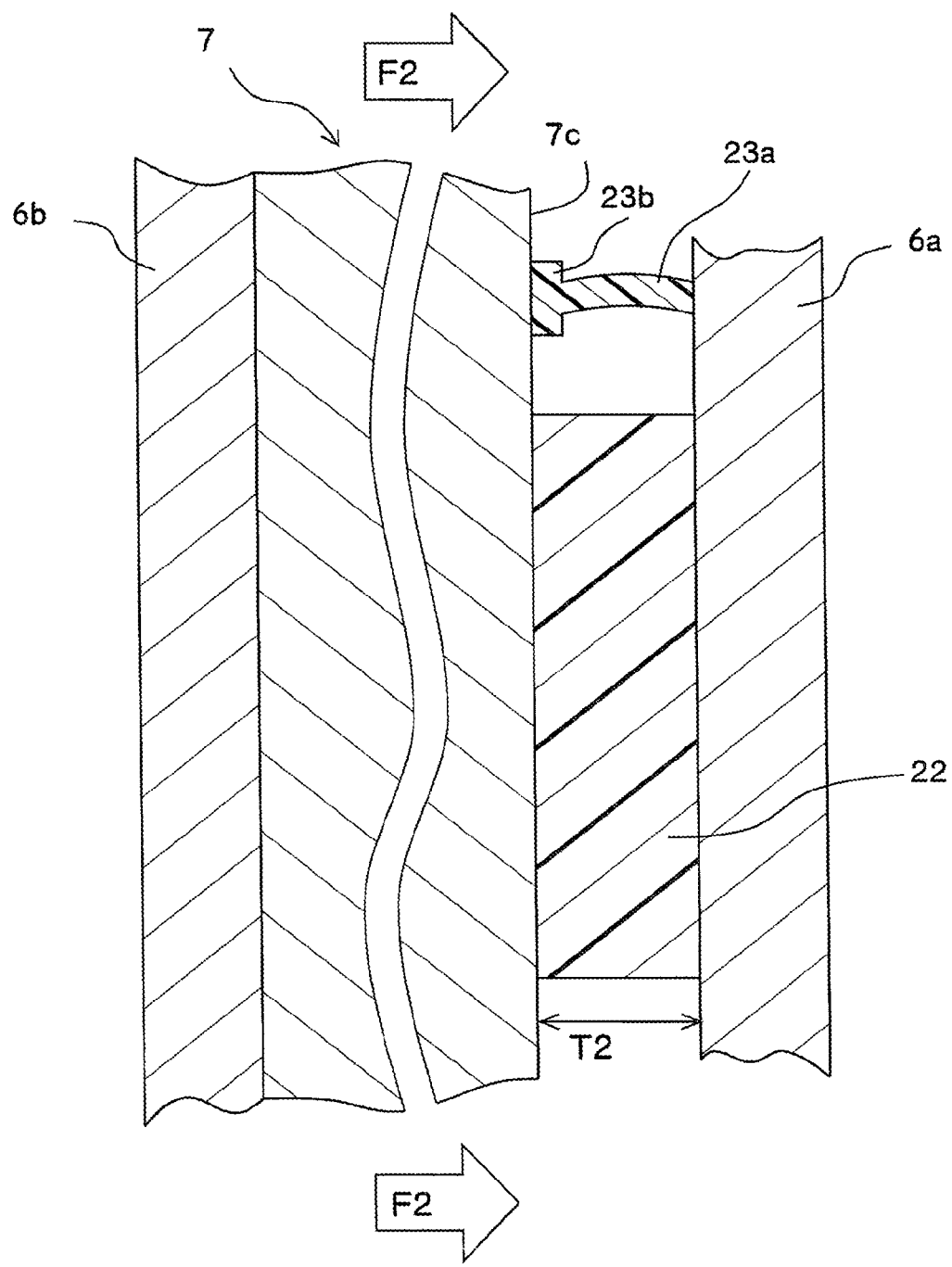
FIG. 13C is a lateral view of a state in which pressure is applied to the first buffer material and the second buffer material.

As shown in FIG. 13A, FIG. 13B, and FIG. 13C, the lower buffer materials 21 include second buffer materials 22 and first buffer materials 23. The material and shape of the second buffer materials are similar to those in the previous embodiment, and descriptions thereof are omitted.

The first buffer materials 23 include buckling parts 23a and support parts 23b. The support parts 23b have a role in lessening damage to the bottom surface 7c of the HDD 7 by the buckling parts 23a, and also in determining positions of the buckling parts 23a with respect to the HDD 7. Therefore, the support parts 23b are formed with flat surfaces having a desired area size along the bottom surface 7c. The configuration and the used material here are identical to those described in the previous embodiment, and descriptions thereof are omitted. The buckling parts 23a have a round cross section and a column shape. The buckling characteristics of the buckling parts 23a can be modified by changing the area size of a cross section thereof cut by a surface parallel to the bottom surface 7c of the HDD 7, even when the identical material is used. Therefore, lessening of an impact with respect to the HDD 7 can be controlled by the cross-sectional area. It should be noted that although the buckling parts 23a that are pillar are used in the present embodiment, the shape of their cross-sectional area is not limited to a circle, and may be an oval, elliptical form, rectangle, etc. Furthermore, although the buckling parts 23a that are column shaped are used, they may have a plate-like shape. When the buckling parts 23a having a plate-like shape are used, for example, even if the length of the buckling parts 23a in the up-and-down direction with respect to the paper surface of FIG. 13A is the same, the buckling characteristics of the buckling parts 23a can be controlled by changing their length in the obverse-and-reverse direction of with respect to the paper surface.

Furthermore, although the bend direction of the buckling parts 23a has been described as in the upper side of the paper surface, this is merely one example, and the bend direction in the lower side of the paper surface, or, if the cross-sectional shape in the stand direction of the buckling parts 23a is a column shape, the bending may occur randomly in the obverse-and-reverse direction etc., of the paper surface.

2-5. Buffer Configuration 2 of HDD

Figure 14:
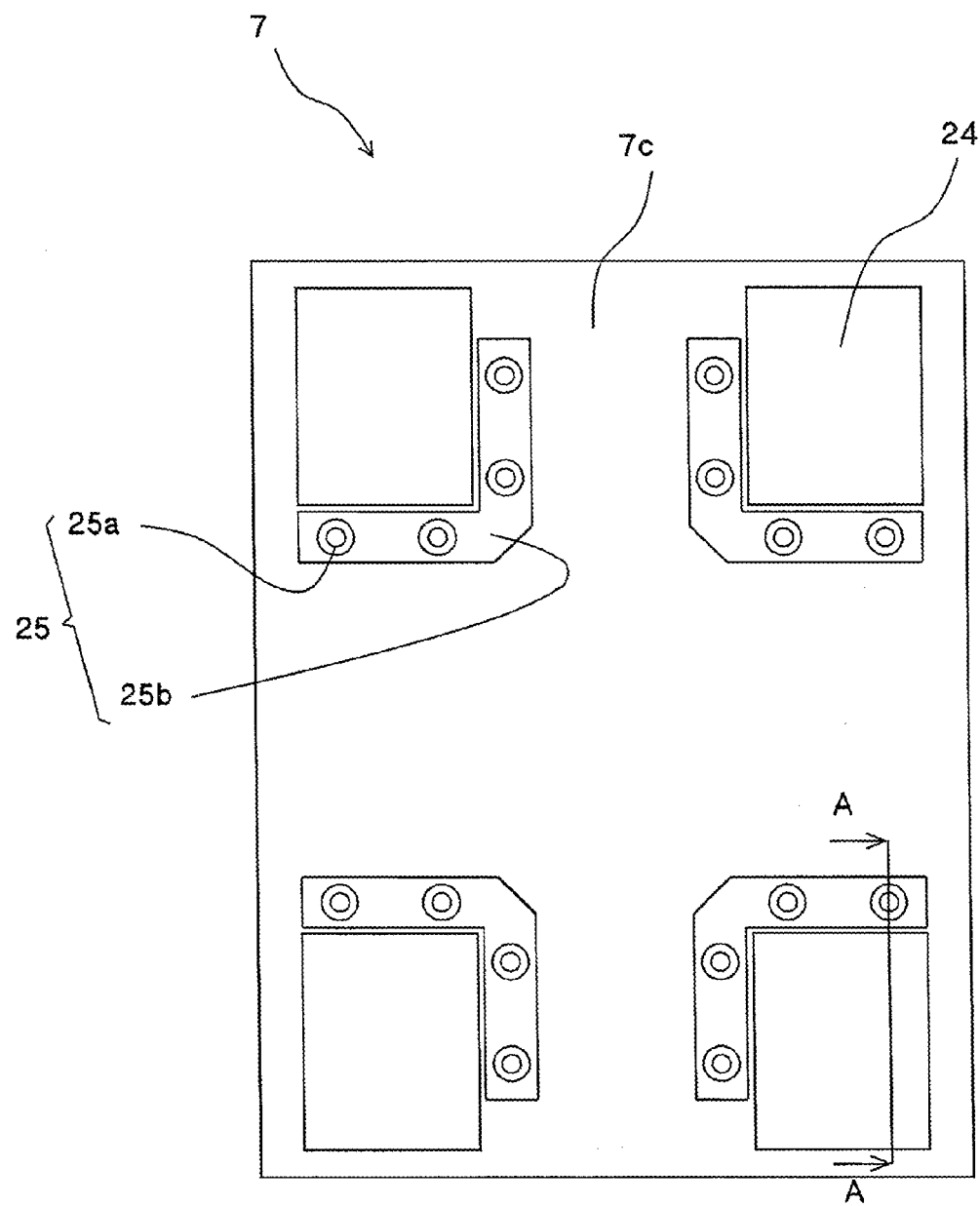
FIG. 14 is a plan view of a state in which another first buffer material and a second buffer material are mounted on an HDD.

FIG. 14 is a front view of the HDD 7 from the lower buffer materials, and the lower buffer materials include first buffer materials 25 and second buffer materials 24. Furthermore, the first buffer materials 25 include buckling parts 25a and support parts 25b. It should be noted that, in the present embodiment, the lower buffer materials support only the HDD 7 on the lower principal surface 6a of the case 6 as described later, and the top surface 7d of the HDD 7 (cf. FIG. 12) is making surface contact with the upper principal surface 6b of the case 6 in a slidable manner. Furthermore, the second buffer materials 24 and the first buffer materials 25 are arranged on the bottom surface 7c so as to be adjacent to each other, and are making surface contact with the bottom surface 7c of the HDD 7 through adhesion. When housed in the case 6, the second buffer materials 24 and the HDD 7 are sandwiched within a gap between the lower principal surface 6a and the upper principal surface 6b, and there is a gap d between the buckling parts 25a of the first buffer materials 25 and the lower principal surface 6a. It should be noted that materials, configuration, etc., of the second buffer materials 24 and the first buffer materials 25 are similar to those in the previous embodiment, and descriptions thereof are omitted.

Figure 15A:
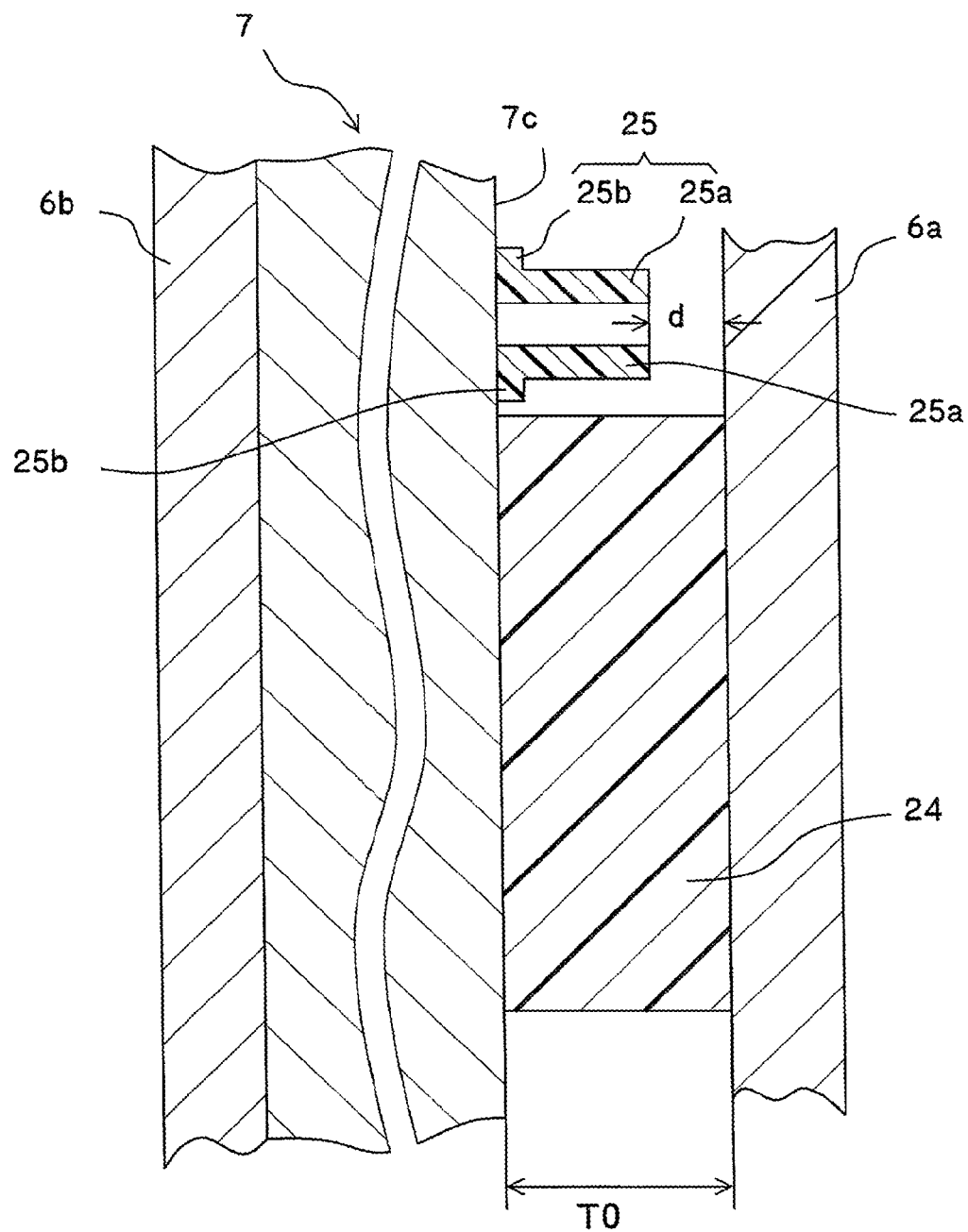
FIG. 15A is a lateral view of a state in which pressure is not applied on the first buffer material and the second buffer material.
Figure 15B:
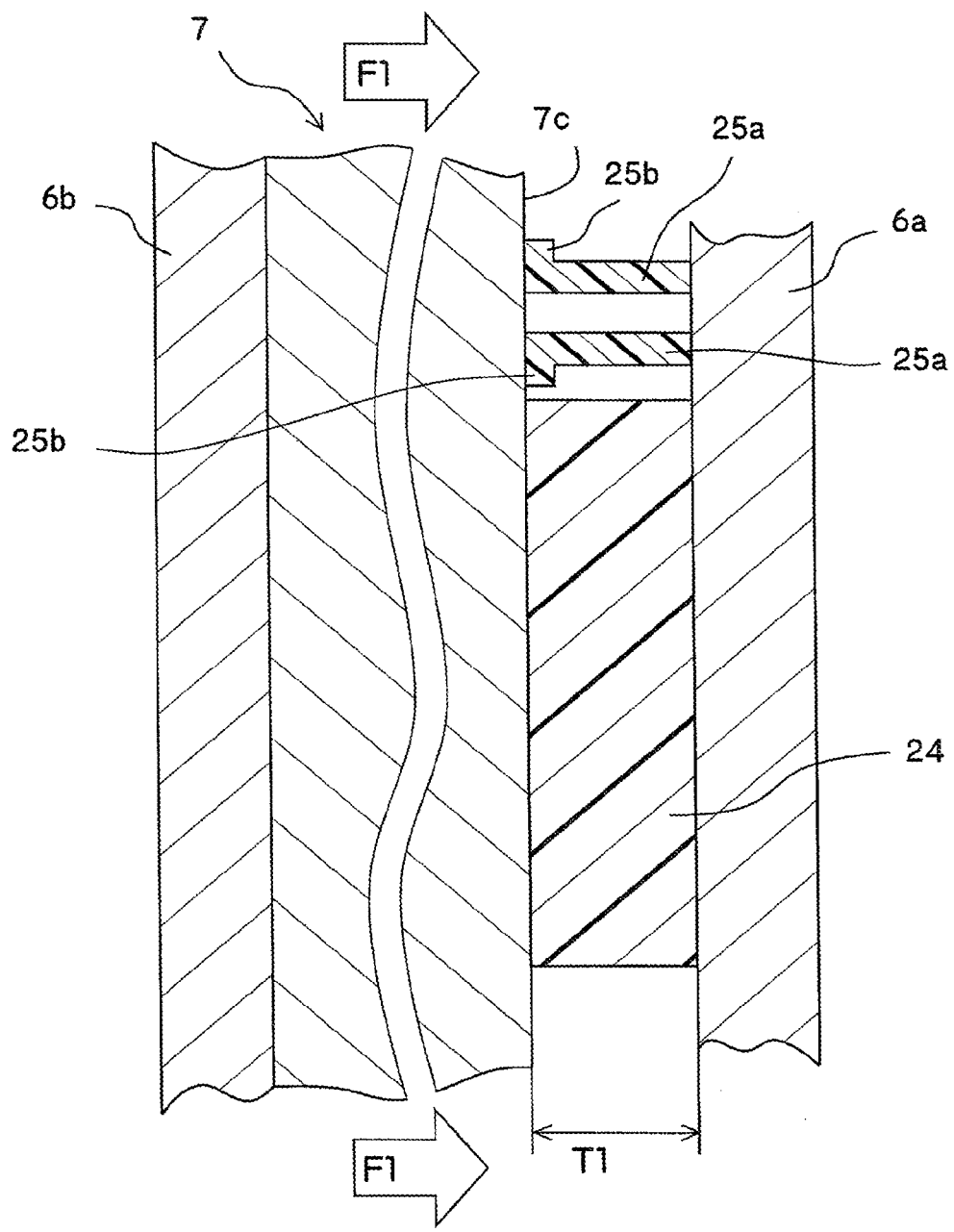
FIG. 15B is a lateral view of a state in which pressure is not applied on the first buffer material.
Figure 15C:
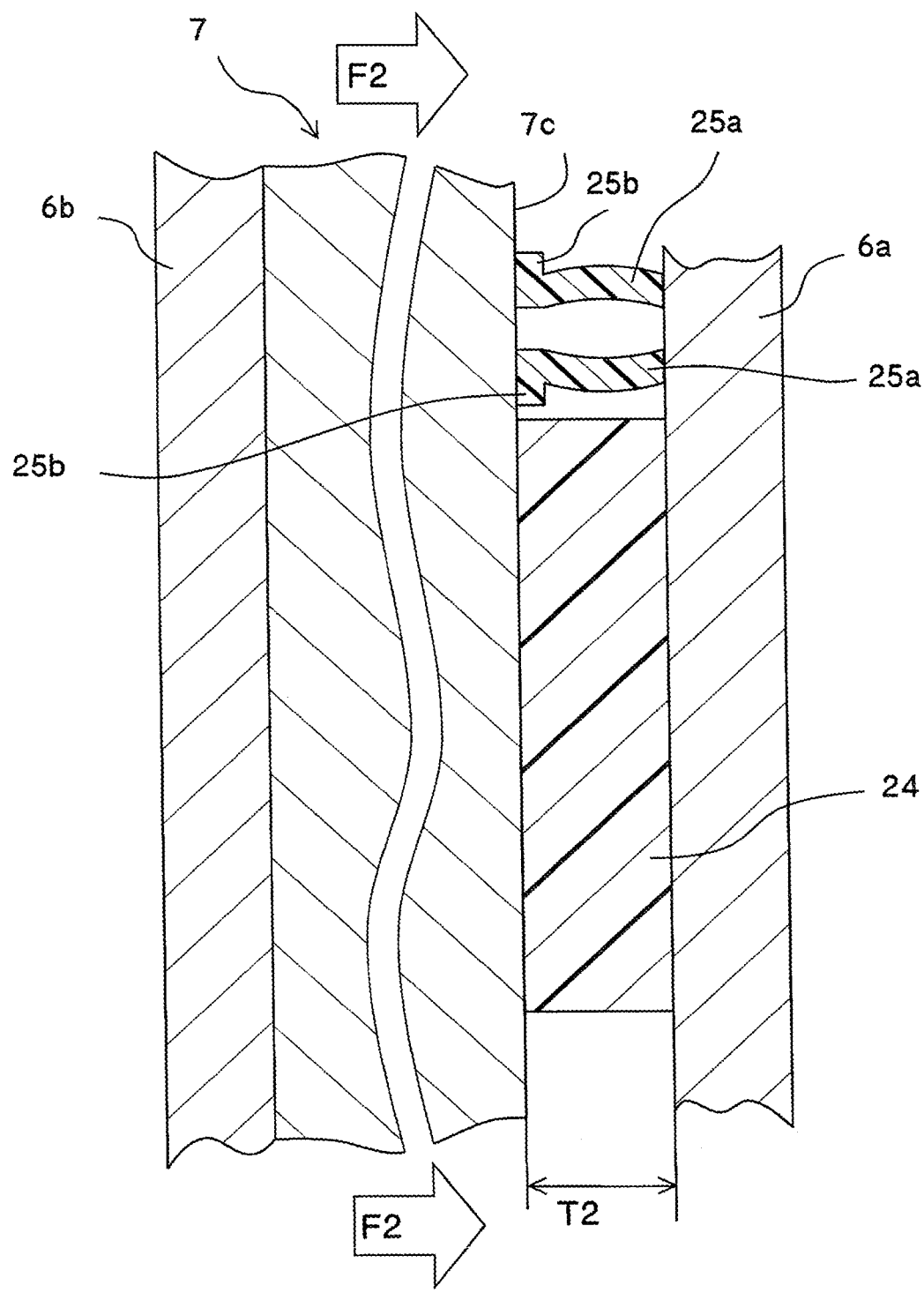
FIG. 15C is a lateral view of a state in which pressure is applied on the first buffer material and the second buffer material.

Thus, as shown in FIG. 15A, FIG. 15B, and FIG. 15C, also in the present embodiment, since the impact-buffering against external disturbance applied to the HDD 7 is similar to that described in, for example, FIG. 5A, FIG. 5B, and FIG. 5C; detailed description thereof is omitted. Other than in the perpendicular direction of the bottom surface 7c of the HDD 7, vibration attributed to external disturbance also generates shaking in the surface direction. The action of the first buffer materials 25 with respect to the shaking is similar to that described in, for example, FIG. 5A, FIG. 5B, and FIG. 5C. However, since the top surface 7d of the HDD 7 and the upper principal surface 6b of the case 6 are making surface contact via a slidable member (e.g., a fluorine-containing resin, a polyacetal resin, etc.) as described above, this configuration can be applied also to slippage in the up-and-down direction of the paper surface or the obverse-and-reverse direction of the paper surface due to the shaking.

Figure 16A:
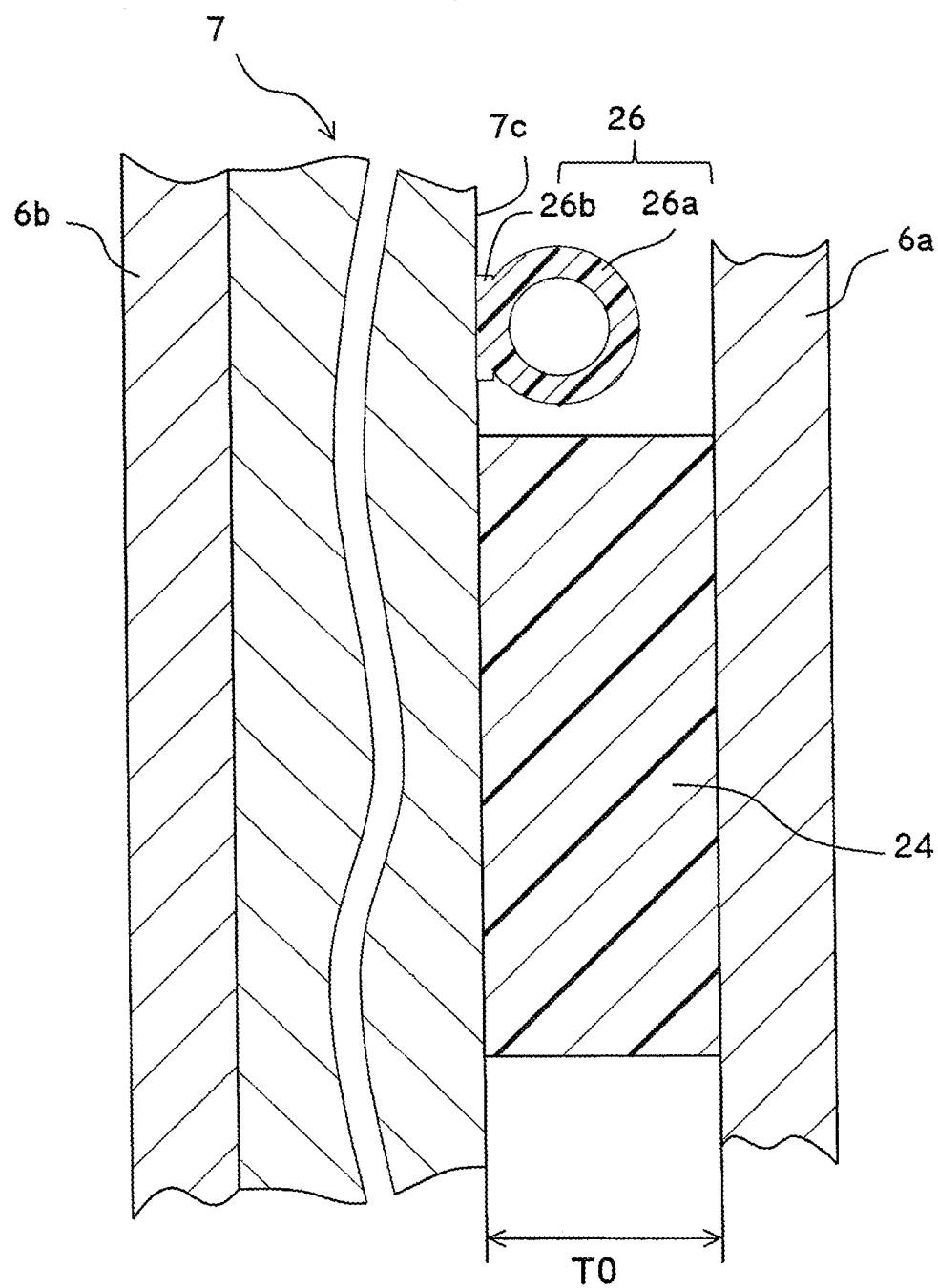
FIG. 16A is a lateral view of a state in which pressure is not applied on another first buffer material and a second buffer material.
Figure 16B:
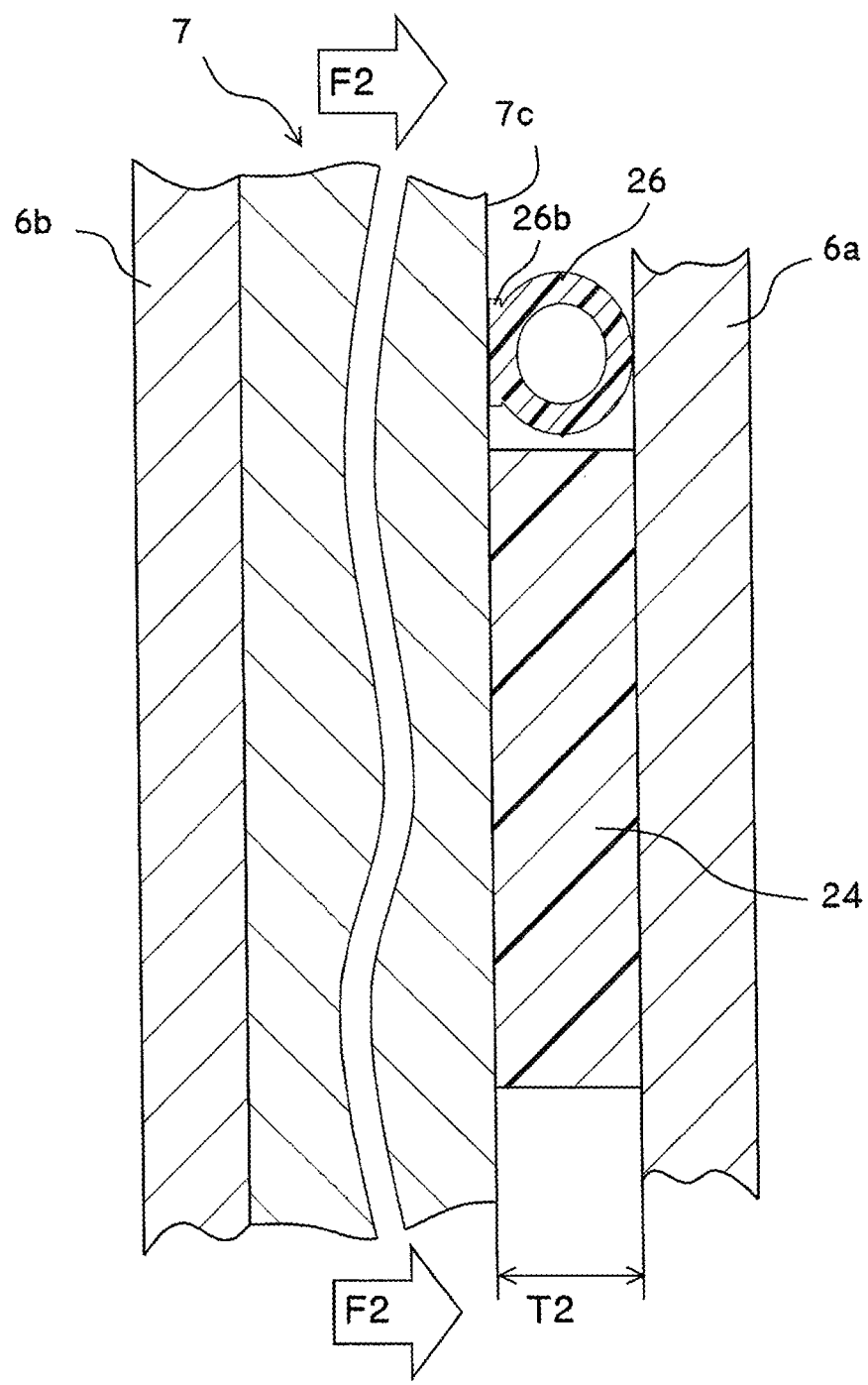
FIG. 16B is a lateral view of a state in which pressure is applied on the first buffer material and the second buffer material.

Furthermore, as shown in FIG. 16A and FIG. 16B, first buffer materials 26 include buckling parts 26a and support parts 26b that support the buckling parts 26a. In a state in FIG. 16A in which vibration attributed to external disturbance of the HDD 7 is not applied, the buckling parts 26a has a spherical shape whose cross-sectional shape is circular. When impact to the HDD 7 generated due to external disturbance cannot be buffered by the second buffer materials 24 themselves, as shown in FIG. 16B, the impact is absorbed through flexuous deformation of the buckling parts 26a of first buffer materials 26. Furthermore, since the first buffer materials 26 include the buckling parts 26a that are spherical, impact can be similarly lessened against not only for vibration orthogonal with respect to the bottom surface 7c of the HDD 7 as shown in FIG. 16B, but also vibration from all directions. The buckling capacity of the first buffer materials 26 can be adjusted by the film-thickness, radius, etc., of the buckling parts 26a. Furthermore, although a configuration in which air is closed inside the buckling parts 26a is shown, the buckling parts 26a may have penetration holes as long as their outer shapes are spherical. Further, instead of the spherical outer shapes of the buckling parts 26a, their outer shapes may have a circular curved surface such as hemisphere form, spheroid body, hemi-spheroid body, etc. It should be noted that, as one example of the first buffer materials 26, the buckling parts 26a having an outer diameter of 4 mm and a thickness of 1 mm, and the support parts 26b having a disk-shape made of a silicone rubber with a thickness of 1 mm and a diameter 3 mm are used.

Figure 17A:
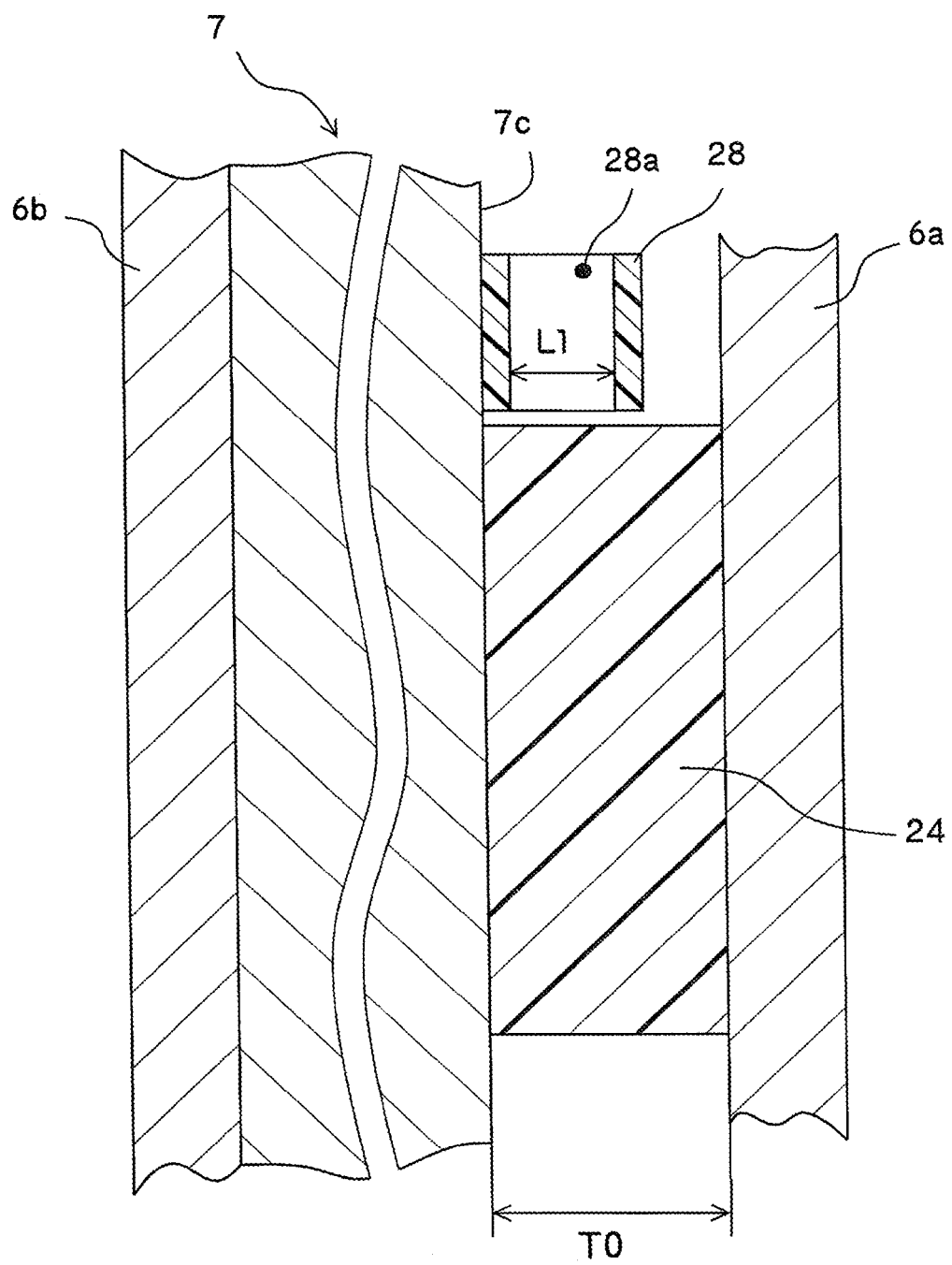
FIG. 17A is a lateral view of a state in which pressure is applied to another first buffer material and a second buffer material.
Figure 17B:
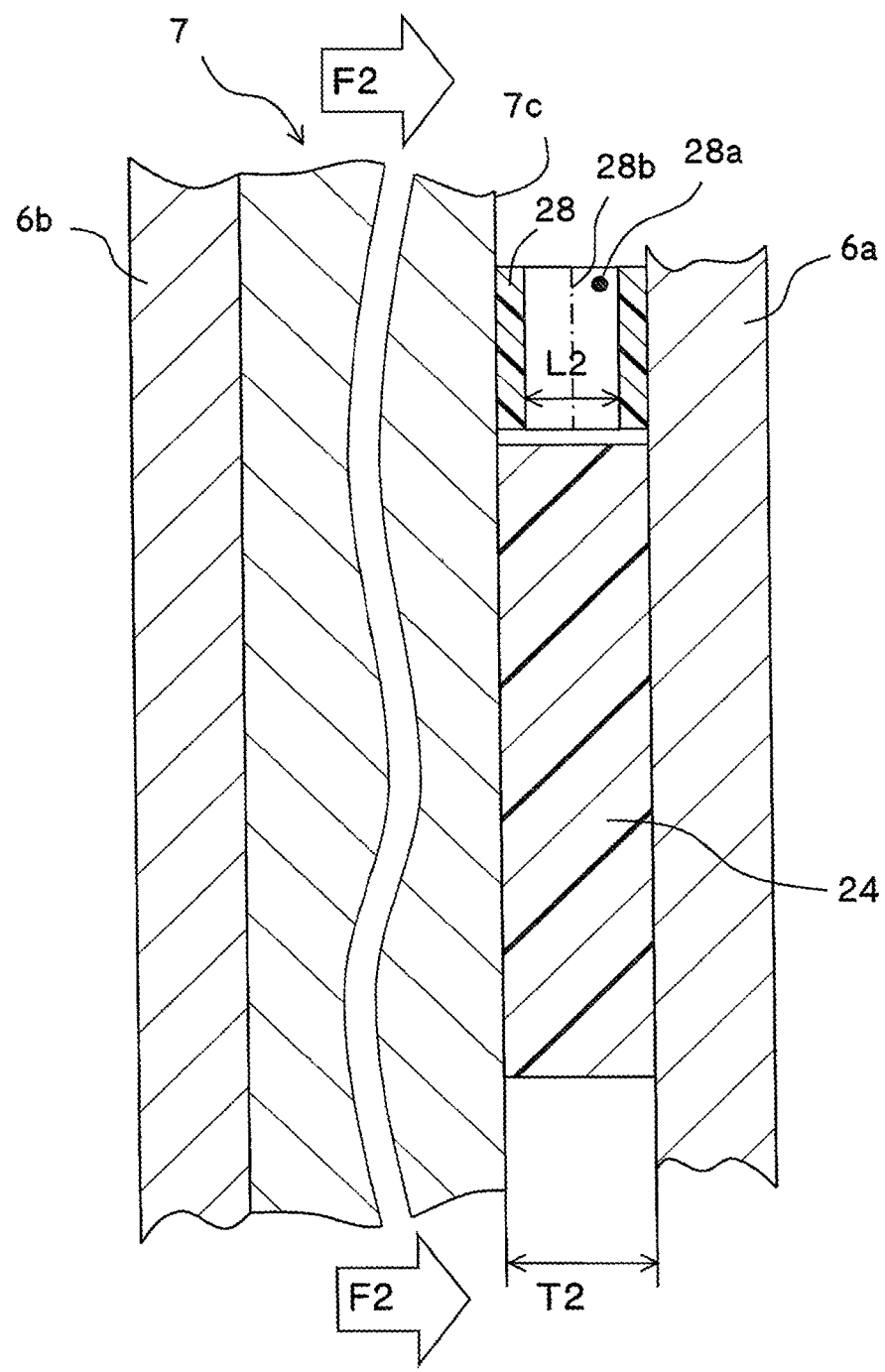
FIG. 17B is a lateral view of a state in which pressure is applied to the first buffer material and the second buffer material.

When a hollow pillar is used as the first buffer materials 25 as shown in FIG. 15A, FIG. 15B, and FIG. 15C, it is also possible to use first buffer materials 28 formed such that their pillar lateral surface follow along the bottom surface 7c of the HDD 7 as shown in FIG. 17A and FIG. 17B. The first buffer materials 28 include buckling parts 28a in their whole inner circumferential surfaces. When vibration caused by external disturbance is applied to the HDD 7 and when the vibration exceeds an impact level that can be lessened only by the second buffer materials 24, the impact can be lessened by having the buckling parts 28a buckle at buckling lines 28b as shown in FIG. 17B. It should be noted that, the buckling parts 28a of the first buffer materials 28 are formed as a hollow cylinder with a thickness of 1 mm and a length of 4 mm. The buckling parts 28a is made of a silicone rubber whose thickness is 1 mm with respect to the bottom surface 7c of the HDD 7 and whose width is 4 mm in the obverse-and-reverse direction of the paper surface. The buckling capacity of the first buffer materials 28 can be adjusted by the film-thickness of the buckling parts 28a, the radius of the buckling parts 28a, etc. It should be noted that, although a hollow cylinder shape is used in the present embodiment, the shape may be pillar instead of being hollow, or may be a hollow quadrangular shape etc., or a polygon such as a square pillar shape etc.

2-6. Advantageous Effects Etc.

It is possible to improve shock resistance of the HDD 7 housed in the case 6 and to simultaneously achieve a small thickness for the case 6 in all configurations having, on the bottom surface 7c of the HDD 7: only the first buffer materials 23 and the second buffer materials 22; only the first buffer materials 25 and the second buffer materials 24; only the first buffer materials 26 and the second buffer materials 24; and only the first buffer materials 28 and the second buffer materials 24. Therefore, a slimmed-down PC with improved shock resistance can be provided.

By having the first buffer materials 23 include the support parts 23b for supporting the buckling parts 23a that has a column shape, it is possible to arrange the support parts 23b along the bottom surface 7c of the HDD 7, determine the positions of the first buffer materials 23, and lessen contact of the buckling parts 23a with respect to the bottom surface 7c. Furthermore, with the shapes of the buckling parts 23a being plate-like shapes spread along lateral surfaces of the second buffer materials 22, by using a simple technique of adjusting the area size of the buckling parts 23a, it is possible to suppress impact caused by external disturbance in the orthogonal orientation with respect to the thickness direction of the buckling parts 23a.

By using the first buffer materials 25 having a hollow column shape and including the buckling parts 25a and the support parts 25b, it is possible to have the buckling parts 25a buckle when being subjected to external disturbance so has to have a drum shape to obtain a constant bend direction, and exert restorability by compressed air as a result of air confined in the hollow portions. The buckling capacity of the buckling parts 25a can be controlled with the film-thickness of the buckling parts 25a.

By having the first buffer materials 26 include the buckling parts 26a that are hollow and spherical, it is possible to achieve buckling and restoration regardless of the applied direction of the external disturbance, and promote restorability caused by compression of sealed air. In addition, the buckling capacity of the buckling parts 26a can be controlled by changing their thickness and/or the diameter of the sphere. On the other hand, when penetration holes are provided to the buckling parts 26a, the buckling capacity of the buckling parts 26a can be controlled by their thickness. Furthermore, the outer shape of the buckling parts 26a does not have to be spherical, and, as long as their cross sections parallel to the pair of supporting flat surfaces are circular, their shapes may be hemisphere form, spheroid body, rotation shape having a narrow part on one side of the buckling parts 26a, etc. Instead of being hollow, their insides may be filled.

As with the first buffer materials 28, it is possible to have a circumferential side of the hollow cylindrical shape to follow along the bottom surface 7c of the HDD 7. The outer shape of the first buffer materials 28 may be a cylinder or a polygonal column. It should be noted that, the buckling characteristic of the first buffer materials 28 can be controlled with the film-thickness of the buckling parts 28a when they are hollow, or can be controlled with the sizes of the cross sections orthogonal to central axes of the buckling parts 28a when they are columns filled to their central axes.

It should be noted that the above described first buffer materials 23, 25, 26, 27, and 28 can be apply to all the first buffer materials in Embodiment 1.

Embodiment 3

3-1. Configuration of HDD

Figure 18:
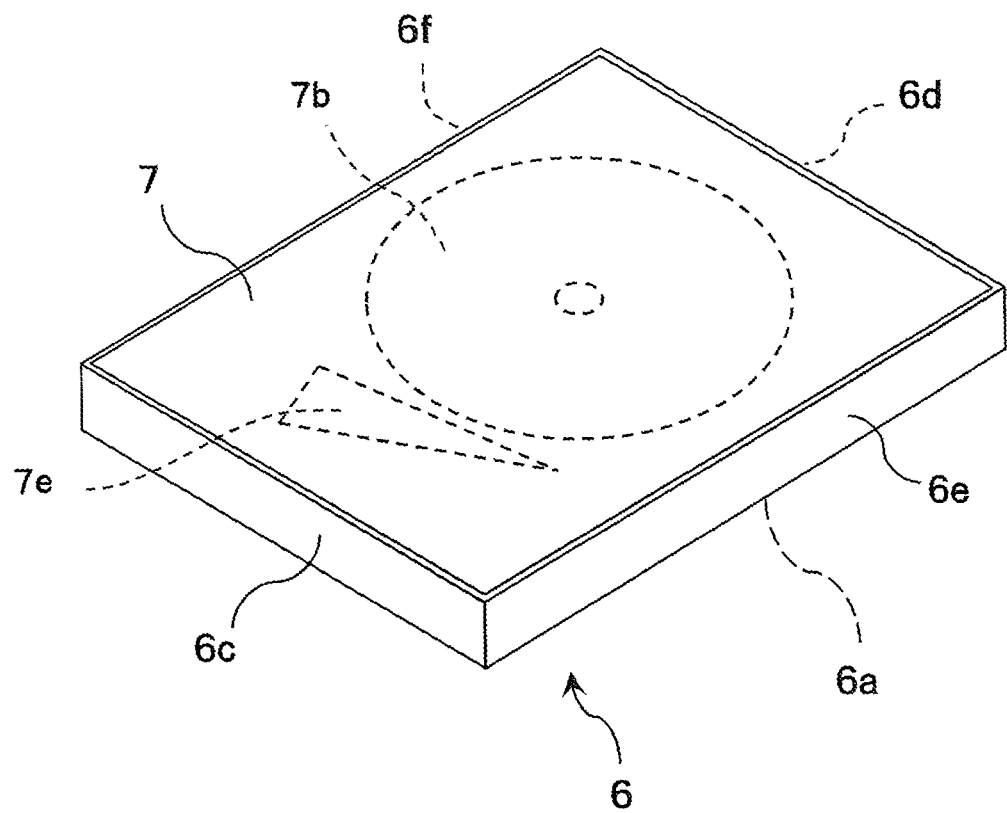
FIG. 18 is an exterior perspective view of a hard disk drive (HDD) that is to be built in a PC.

FIG. 18 is a perspective view of the HDD 7 housed in a case 6. The configuration of the HDD 7 is similar to that in, for example, FIG. 12; and description thereof is omitted. In addition, the case 6 is similar to the lower side of the case 6 (the lower principal surface 6a, the below-electrode lateral surface 6c, the opposing lower lateral surface 6d, the lower right lateral surface 6e, and the lower left lateral surface 6f) in, for example, FIG. 12; and description thereof is omitted.

3-2. Buffer Configuration of HDD

Figure 19A:
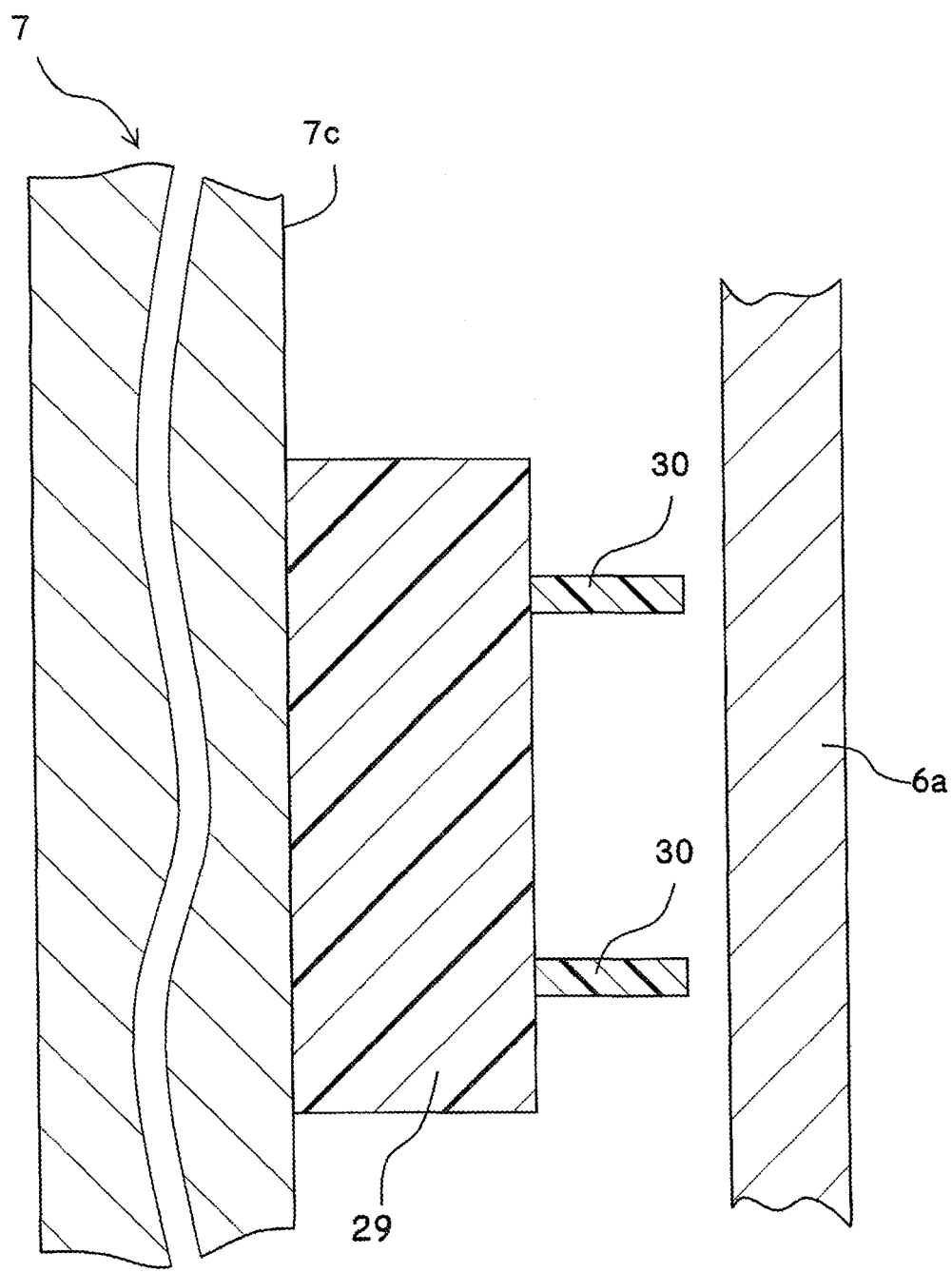
FIG. 19A is a lateral view of a state in which a first buffer material and a second buffer material are mounted on an HDD.

A buffer configuration for the case 6 of the HDD 7 shown in FIG. 18 is shown as lateral views of partial cross-section in FIG. 19A, FIG. 19B, FIG. 19C, and FIG. 19D. As shown in FIG. 19A, FIG. 19B, FIG. 19C, and FIG. 19D, second buffer materials 29 are disposed on the bottom surface 7c of the HDD 7, and first buffer materials 30 are interposed between the second buffer materials 29 and the lower principal surface 6a of the case 6. In order to make the description easy to understand, FIG. 19A shows a state before the HDD 7 is mounted in the case 6, and the lengths of the second buffer materials 29 and the first buffer materials 30 are their natural length without having any load applied thereto.

Volume, material, etc., of the second buffer materials 29 and the first buffer materials 30 are determined in view of the weight of the HDD 7 itself and the external disturbance applied to the HDD 7.

The second buffer materials 29 have a shape of a rectangular parallelepiped or a cube, and in terms of their characteristics, become deformed when pressure is applied thereto until restoring force that is equivalent to the pressure is generated, and regain their original shape when the applied pressure is eliminated. In terms of their configuration, one surface of each of the second buffer materials 29 is arranged so as to be attached firmly to a side of the HDD 7, and the other surface parallelly opposing this one surface is attached firmly to the first buffer materials 30 described later. With this configuration, external disturbance applied to the HDD 7 through the case 6 is buffered by oscillation of the second buffer materials 29 in their thickness direction. By using an adhesive, the second buffer materials 29 are fixed to the bottom surface 7c of the HDD 7, and the first buffer materials 30 are fixed to surfaces of the second buffer materials 29 opposing the lower principal surface 6a. Therefore, positions of the second buffer materials 29 and the first buffer materials 30 are determined with respect to the HDD 7. As the material of the second buffer materials 29, the same material and size in, for example, the second buffer materials 10 can be used; and description thereof is omitted.

The first buffer materials 30 have a columnar shape, and make contact at their cross sections orthogonal to the long side direction of the column between the lower principal surface 6a of the case 6 and the second buffer materials 29 attached firmly to the HDD 7. Therefore, external disturbance applied to the HDD 7 is conveyed to the second buffer materials 29. When there is excessive impact that cannot be lessened and absorbed by the second buffer materials 29, the first buffer materials 30 undergo a so-called buckling motion of: flexuously deforming such that the restoring force generated due to the flexuous deformation become equivalent to the impact; and regaining their original shapes when the impact is removed. Furthermore, the size of the impact at which the first buffer materials 30 buckle can be adjusted by the cross-sectional area size of the columns of the first buffer materials 30. For example, the cross-sectional areas of the first buffer materials 30 at the interface between the first buffer materials 30 and the second buffer materials 29 are set such that the first buffer materials 30 do not become permanently embedded in the second buffer materials 29 when external disturbance is applied. Since the material used for the first buffer materials 30 is identical to, for example, that of the buckling parts 23a; description thereof is omitted. Furthermore, with regard to the dimensions of the first buffer materials 30, a pillar shaped silicone rubber having a height of 5 mm and a diameter of 2 mm is used. In the present embodiment, in order to suppress tilt between the second buffer materials 29 and the HDD 7, two of the first buffer materials 30 are provided on one of the second buffer materials 29. However, the number of the first buffer materials 30 may be one, three, or more, and the number can be freely selected. When a plurality of the first buffer materials 30 are arranged on one of the second buffer materials 29, a gap distance between the lower principal surface 6a and the second buffer materials 29 is set to be equal to the length of the first buffer materials 30.

Figure 19B:
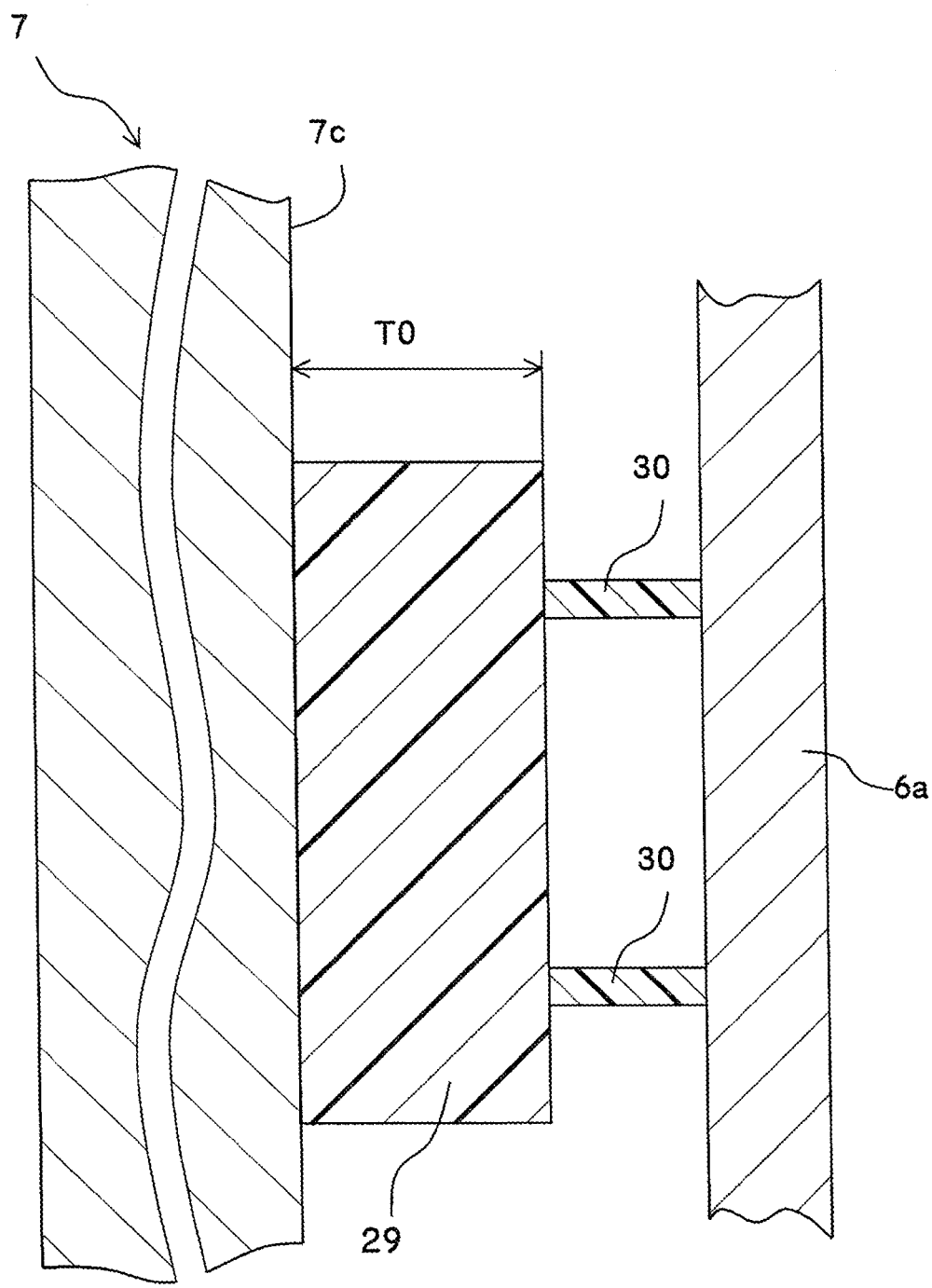
FIG. 19B is a lateral view of a state in which pressure is not applied to the first buffer material and the second buffer material.

Next, description will be provided regarding impact-lessening by the second buffer materials 29 and the first buffer materials 30 when external disturbance is applied to the HDD 7. As shown in FIG. 18, the HDD 7 is housed in the case 6 from its bottom side. As shown in FIG. 19B, with regard to the HDD 7 housed in the case 6, the bottom surface 7c is attached firmly to the second buffer materials 29, end surfaces of the first buffer materials 30 are in contact with surfaces of the second buffer materials 29 opposing the bottom surface 7c, and other ends of the first buffer materials 30 are in contact with the lower principal surface 6a of the case 6. It should be noted that, at contact interfaces between the first buffer materials 30 and the second buffer materials 29, the second buffer materials 29 contract to have a thickness T0 that is smaller than their natural length (i.e., portions of the first buffer materials 30 are embedded in the second buffer materials 29) to maintain balance with the weight of the HDD 7. However, in order to simplify the description, the amount of embedding is ignored in the description.

Figure 19C:
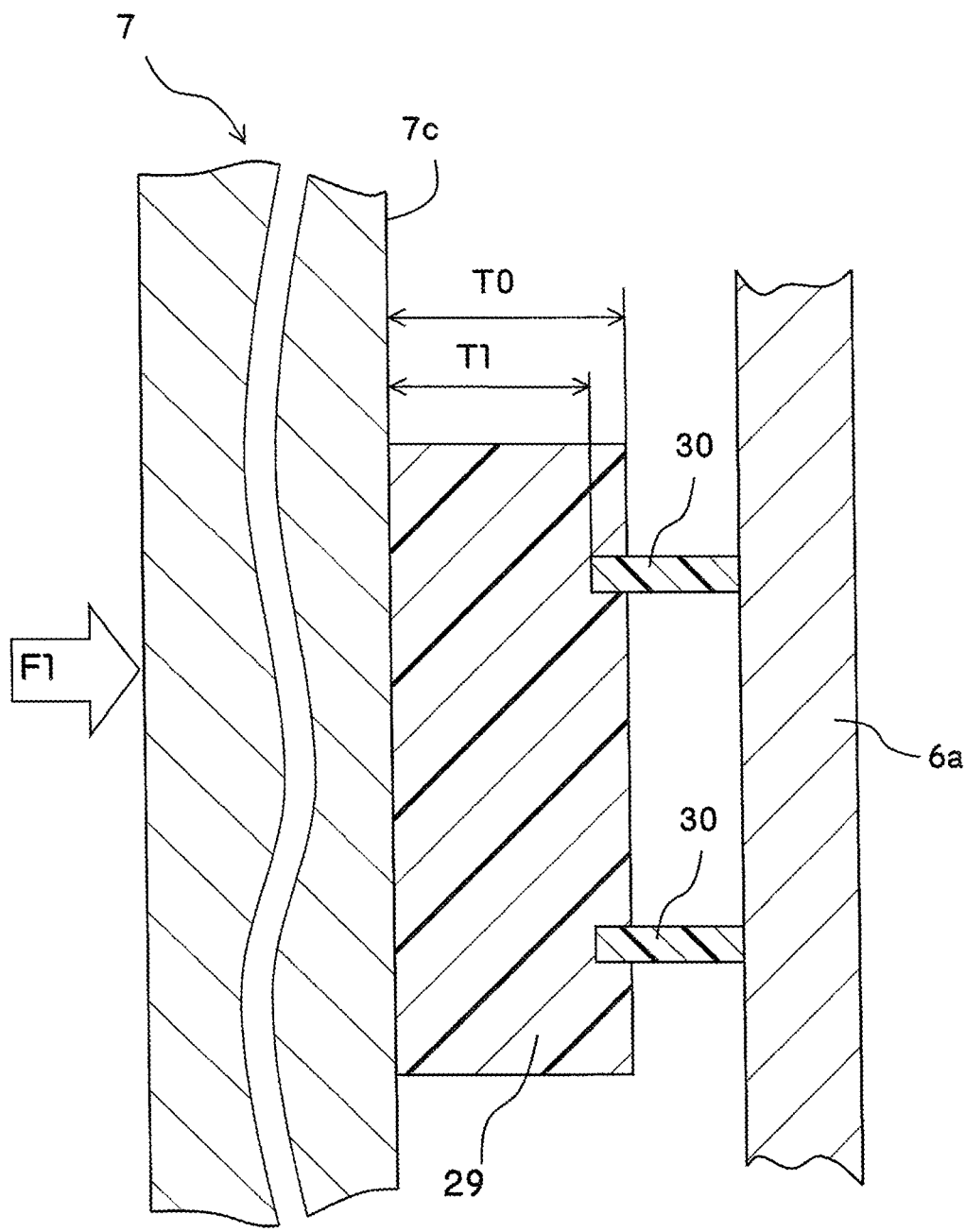
FIG. 19C is a lateral view of a state in which pressure is applied to the first buffer material.
Figure 19D:
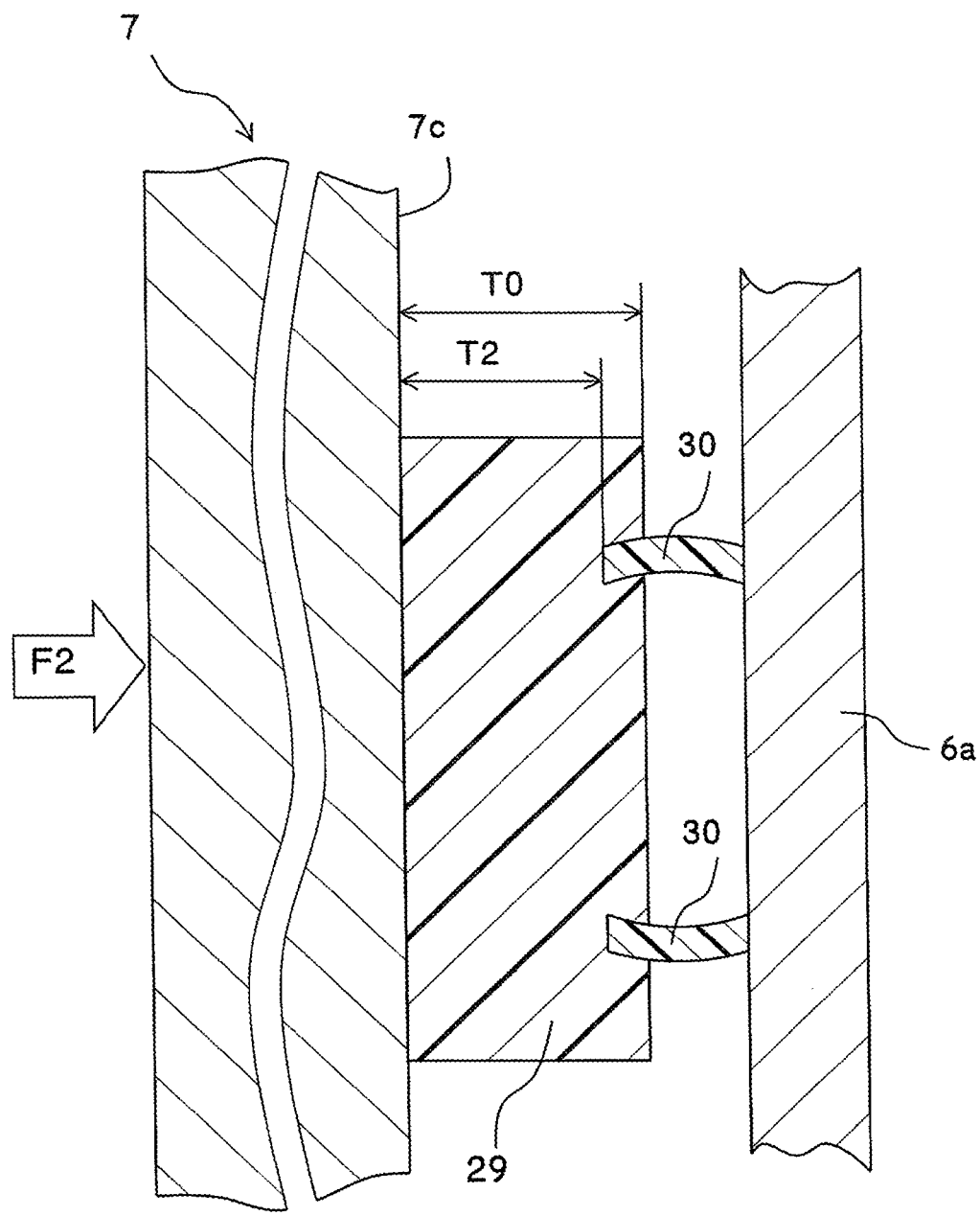
FIG. 19D is a lateral view of a state in which pressure is applied to the first buffer material and the second buffer material.

At this state, when the impact F1 that is generated based on external disturbance and that is weaker than the force at which the first buffer materials 30 buckle but is strong enough to cause the second buffer materials 29 to contract is applied to the HDD 7, the second buffer materials 29 contract in response to the impact F1 and their thicknesses change from T0 to T1 as shown in FIG. 19C. At this moment, the second buffer materials 29 deform at cross sections on the side of the lower principal surface 6a where the first buffer materials 30 make contact, and the first buffer materials 30 embed in the second buffer materials 29 by a thickness of (T0-T1). Even when the second buffer materials 29 contract to the thickness T1, the first buffer materials 30 are in a state identical to prior to the application of external disturbance on the HDD 7 since the first buffer materials 30 do not buckle with the application of the impact F1.

Next, when the even stronger impact F2 is applied to the HDD 7, the second buffer materials 29 contract to T2 that generates restoring force to balance the impact F2 or to a contraction limit T2, and the second buffer materials 29 attempt to balance the impact F2 with an equivalent restoring force corresponding to a contraction amount (T0-T2). When the magnitude of the impact F2 cannot be impact-lessened by the second buffer materials 29 themselves, the first buffer materials 30 buckle to lessen the impact. More specifically, when the impact F2 is equal to or larger than the force at which the first buffer materials 30 buckle, the first buffer materials 30 buckle by the force that is larger than the restoring force obtained when the second buffer materials 29 have the thickness T2. The buckling phenomenon of the first buffer materials 30 is flexuous deformation in which the first buffer materials 30 maintains restorability as shown in, for example, FIG. 19D. However, the illustrated deformation direction is one example, and bend direction of the first buffer materials 30 may be, for example, uniform in one direction, in the obverse-and-reverse direction of the paper surface, or random. Since the buckled first buffer materials 30 have restorability, the first buffer materials 30 are restored to the state in FIG. 19B via the state in FIG. 19C when the applied impact F2 is removed. In addition, when repetitive vibration is generated due to external disturbance, an impact can be lessened by repeating the states shown in FIG. 19B, FIG. 19C, and FIG. 19D.

3-3. Configuration of HDD

Figure 20A:
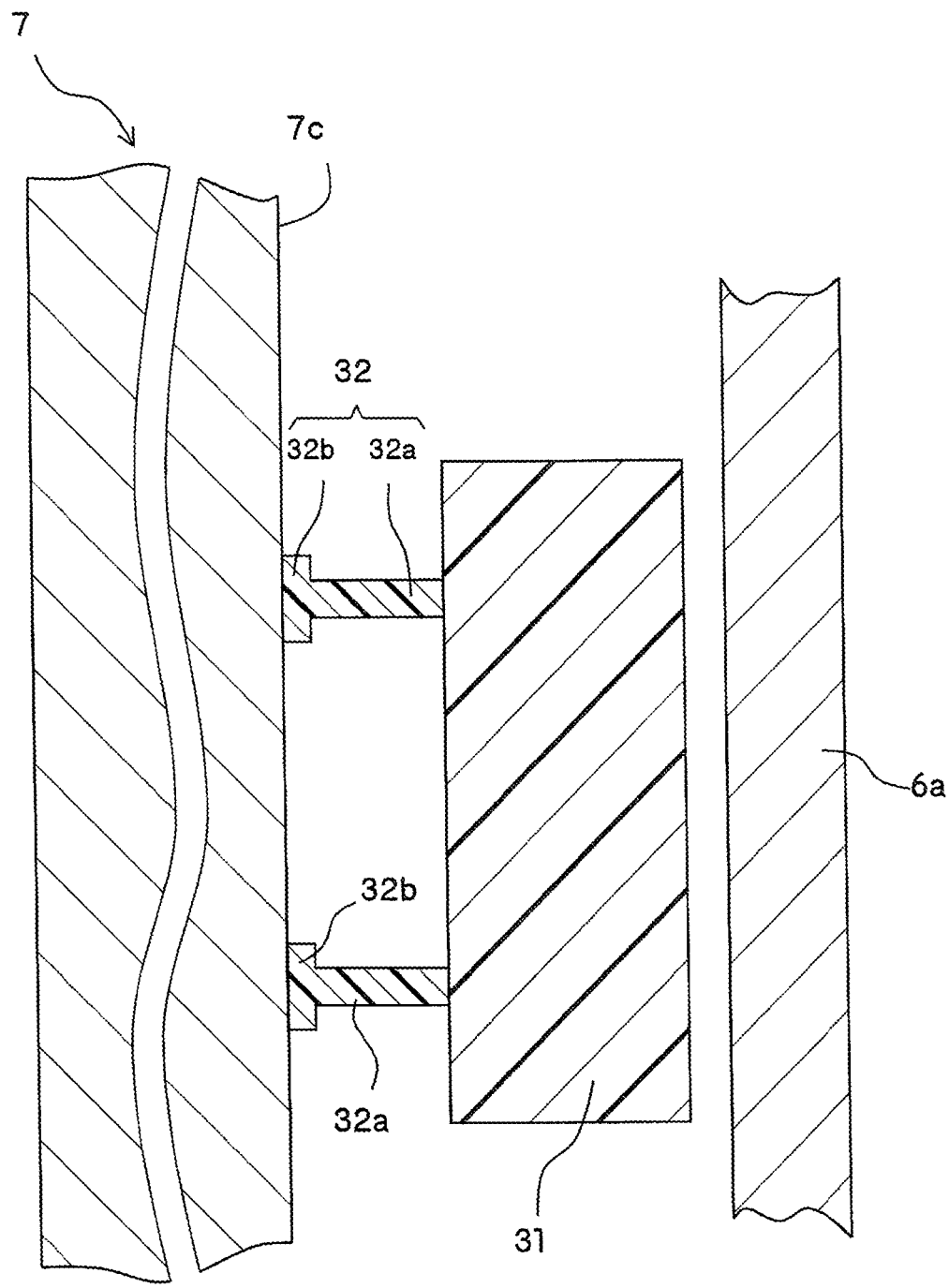
FIG. 20A is a lateral view of a state in which another first buffer material and a second buffer material are mounted on an HDD.

As shown in a lateral view of partial cross-section of FIG. 20A, first buffer materials 32 of the present embodiment include buckling parts 32a and support parts 32b. In addition, with respect to the first buffer materials 32, the support parts 32b are arranged on the bottom surface 7c side of the HDD 7, the buckling parts 32a are arranged on surfaces of second buffer materials 31 opposite to the support parts 32b, and the lower principal surface 6a of the case 6 is positioned on a side of the second buffer materials 31 opposite to the first buffer materials 32. It should be noted that, FIG. 20A shows a state before the HDD 7 is mounted in the case 6, and the lengths of the second buffer materials 31 and the first buffer materials 32 are their natural lengths without having any load applied thereto. The material and shape of the second buffer materials 31 are similar to those of the second buffer materials 29, and descriptions thereof are omitted. In the present embodiment, a urethane foam having a length of 2.5 mm in the long side direction and a length of 2.2 mm in the short side direction of the HDD 7, and a height of 7.5 mm in natural length is used. The material and shape of the first buffer materials 32 are similar to those of the first buffer materials 23 in the previous embodiment, and descriptions thereof are omitted. In the present embodiment, the buckling parts 32a have a pillar shape with a height of 4 mm and a diameter of 2 mm, the support parts 32b have a thickness of 1 mm, and silicone rubber is used as the material for of both.

3-4. Buffer Configuration of HDD

A buffer configuration of the HDD 7 housed in the case 6 is described with reference to lateral views of partial cross-sections in FIG. 4B, FIG. 4C, and FIG. 4D.

The second buffer materials 31 become deformed when pressure is applied thereto until restoring force that is equivalent to the pressure is generated, and regain their original shape when the applied pressure is eliminated. In terms of their configuration, one surface of each of the second buffer materials 31 is arranged so as to oppose the lower principal surface 6a side of the case 6, and the other surface parallelly opposing this one surface is attached firmly to the buckling parts 32a of the first buffer materials 32. With this configuration, external disturbance applied to the HDD 7 through other members is buffered by oscillation of the second buffer materials 31 in their thickness direction. The second buffer materials 31 and the buckling parts 32a are fixed using an adhesive. Since positions of the first buffer materials 32 are determined with respect to the HDD 7, positions of the second buffer materials 31 are determined with respect to the HDD 7 via the first buffer materials 32.

The first buffer materials 32 include the buckling parts 32a that flexuously deform when external disturbance applied to the HDD 7 or the like exceeds the impact-lessening capacity of the second buffer materials 31, and the support parts 32b supporting the buckling parts 32a. Furthermore, the buckling parts 32a have a columnar shape, and make contact at their cross sections orthogonal to the long side direction of the column between the second buffer materials 31 and the first buffer materials 32 which are attached firmly to the HDD 7. Therefore, external disturbance applied to the HDD 7 is conveyed to the second buffer materials 31. When there is excessive impact that cannot be lessened and absorbed by the second buffer materials 31, the buckling parts 32a of the first buffer materials 32 buckle such that the restoring force generated due to the flexuous deformation balances the impact, and regain their original shapes when the impact is removed. Furthermore the size of the impact at which the buckling parts 32a buckle can be adjusted by the cross-sectional area size of the columns of the buckling parts 32a of the first buffer materials 32.

The first buffer materials 32 include the support parts 32b that support the buckling parts 32a from the bottom surface 7c side of the HDD 7. In order to lessen contact of column cross sections of the buckling parts 32a with respect to the bottom surface 7c of the HDD 7, the support parts 32b are formed with flat surfaces having a desired area size along the bottom surface 7c. In the present embodiment, the support parts 32b and the buckling parts 32a are integrally formed using the same material. In the present embodiment, in order to suppress tilting of the HDD 7 (which leads to tilting of the second buffer materials 31 with respect to the lower principal surface 6a), two of the first buffer materials 32 are provided on one of the second buffer materials 31. However, the number of the first buffer materials 32 may be one, three, or more, and the number can be freely selected. When a plurality of the first buffer materials 32 are arranged on one of the second buffer materials 31, a gap distance between the lower principal surface 6a and the second buffer materials 31 is set to be equal to the total length of the buckling parts 32a and the support parts 32b of the first buffer materials 32.

Figure 20B:
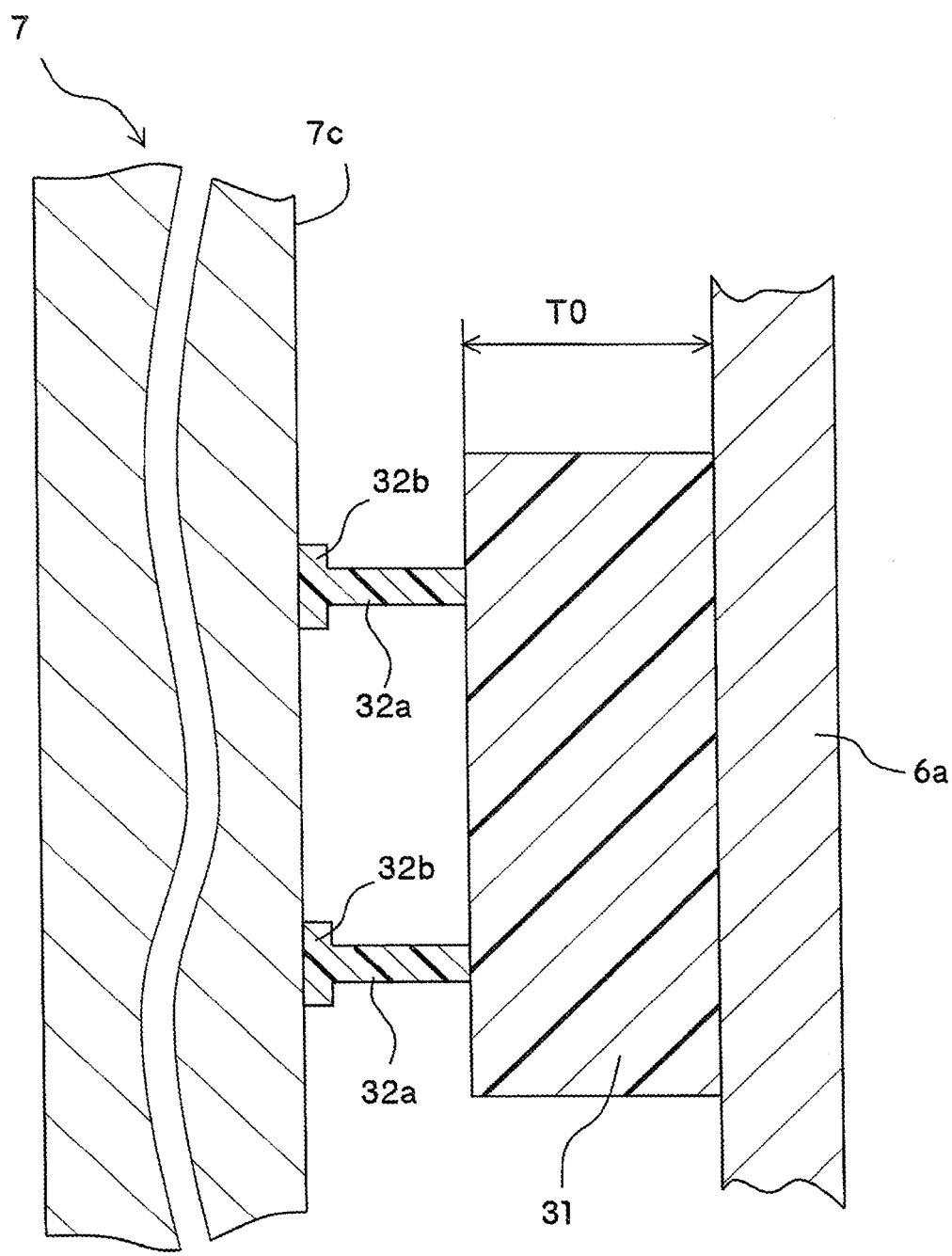
FIG. 20B is a lateral view of a state in which pressure is not applied to the first buffer material and the second buffer material.

Next, description will be provided regarding impact-lessening by the second buffer materials 31 and the first buffer materials 32 when external disturbance is applied to the HDD 7. As shown in FIG. 20B, with regard to the HDD 7 housed in the case 6, the second buffer materials 31 make surface contact with the lower principal surface 6a of the case 6. It should be noted that, at contact interfaces between the second buffer materials 31 and the buckling parts 32a of the first buffer materials 32, the second buffer materials 31 contract to have a thickness T0 that is smaller than their natural length (i.e., portions of the buckling parts 32a of the first buffer materials 32 are embedded in the second buffer materials 31) to maintain balance with the weight of the HDD 7. However, in order to simplify the description, the amount of embedding is ignored in the description.

Figure 20C:
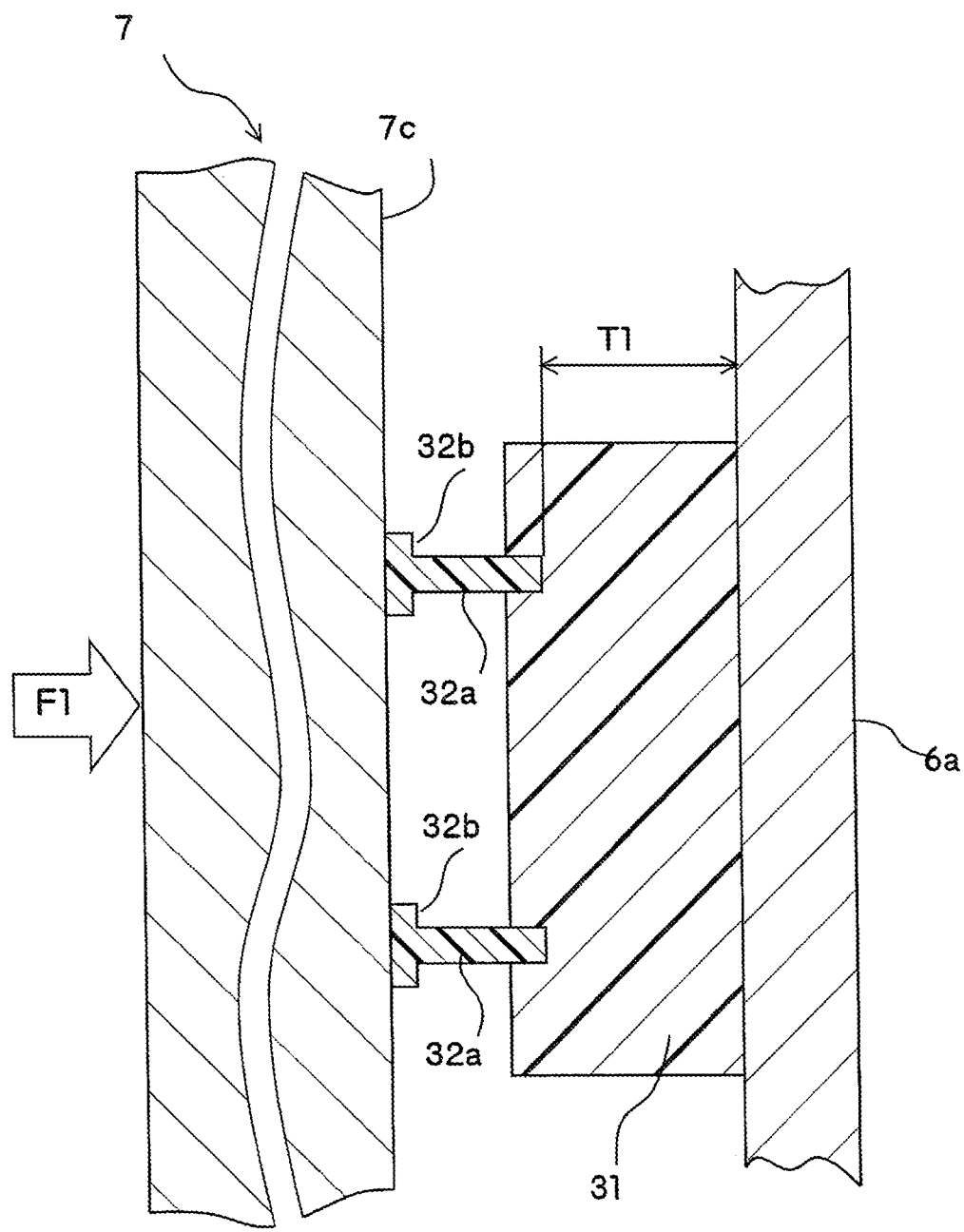
FIG. 20C is a lateral view of a state in which pressure is not applied to the first buffer material.
Figure 20D:
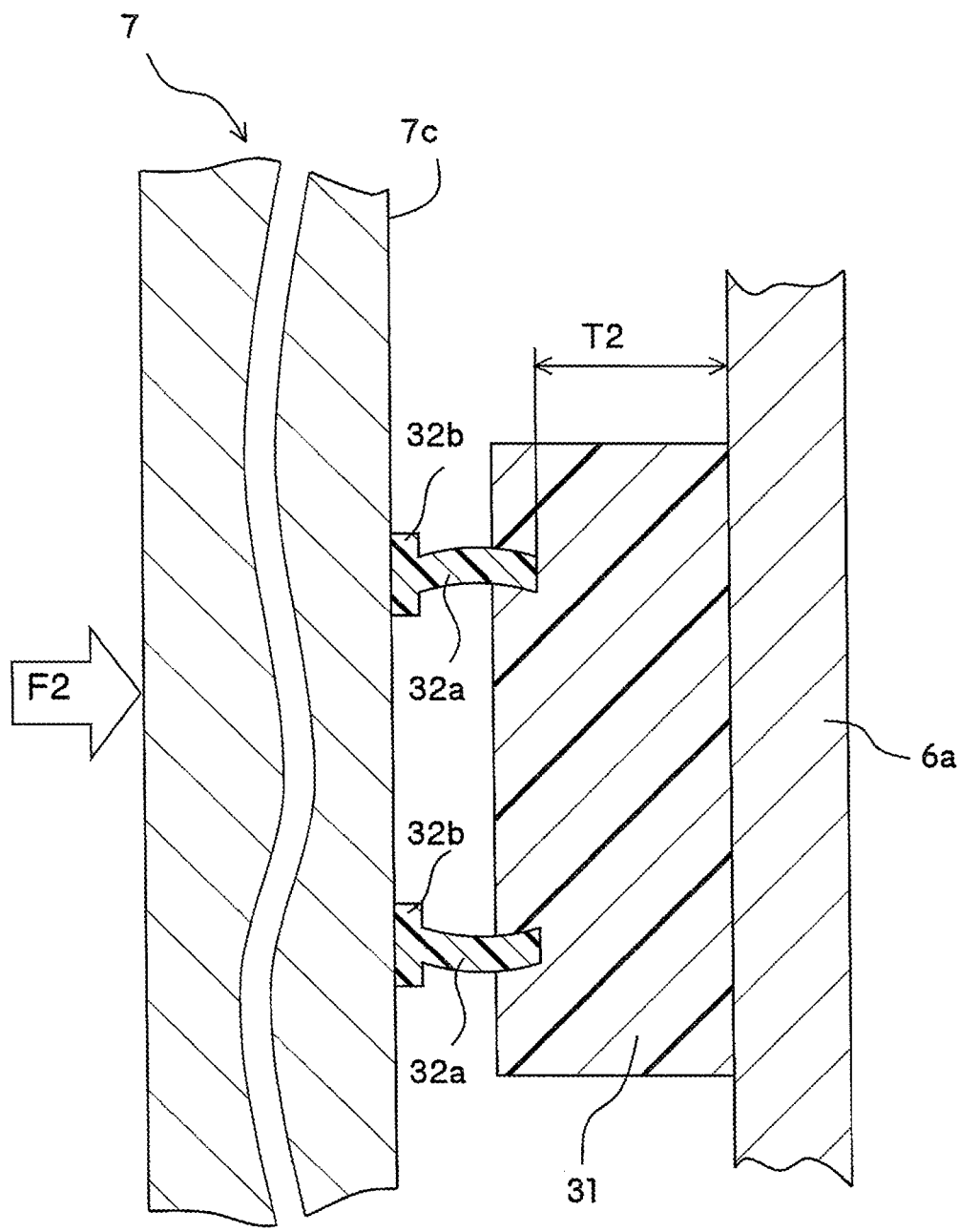
FIG. 20D is a lateral view of a state in which pressure is applied to the first buffer material and the second buffer material.

At this state, when the impact F1 that is generated based on external disturbance and that is weaker than the force at which the buckling parts 32a of the first buffer materials 32 buckle but is strong enough to cause the second buffer materials 31 to contract is applied to the HDD 7, the second buffer materials 31 contract in response to the impact F1 and their thickness change from T0 to T1 as shown in FIG. 20C. At this moment, the second buffer materials 31 deform at cross sections on the side of the lower principal surface 6a where the buckling parts 32a of the first buffer materials 32 make contact, and the buckling parts 32a embed in the second buffer materials 31 by a thickness of (T0-T1). Even when the second buffer materials 31 contract to the thickness T1, the first buffer materials 32 are in a state identical to prior to the application of external force on the HDD 7, since the buckling parts 32a of the first buffer materials 32 do not buckle with the application of the impact F1.

Next, when the even stronger impact F2 is applied to the HDD 7, the second buffer materials 31 contract to T2 that generates restoring force to balance the impact F2 or a contraction limit T2, and the second buffer materials 31 attempt to balance the impact F2 with an equivalent restoring force corresponding to a contraction amount (T0-T2). When the magnitude of the impact F2 cannot be impact-lessened by the second buffer materials 31 themselves, the buckling parts 32a of the first buffer materials 32 buckle to lessen the impact. More specifically, when the impact F2 is equal to or larger than the force at which the buckling parts 32a buckle, the buckling parts 32a of the first buffer materials 32 buckle by the force that is larger than the restoring force obtained when the second buffer materials 31 have the thickness T2.

It should be noted that the relationship between the buckling parts 32a and the second buffer materials 31 is similar to those described previously with reference to FIG. 19B, FIG. 19C, and FIG. 19D.

Furthermore, the support parts 32b can lessen contact to the bottom surface 7c of the HDD 7 through a columnar cross-sectional area such as that of the buckling parts 32a which is in contact with the second buffer materials 31. Furthermore, the support parts 32b can follow along the outer surface of the bottom surface 7c with certainty. As a result, it is possible to determine positions of the buckling parts 32a with respect to the HDD 7, prevent damage to the HDD 7, and achieve certain support by the buckling parts 32a.

3-5. Advantageous Effects Etc.

With a configuration in which the first buffer materials 30 and the second buffer materials 29 are provided so as to serially stand with respect to the HDD 7, impact-lessening through the above described action can be achieved against external disturbance in the perpendicular direction with respect to the lower principal surface 6a of the case 6 and the bottom surface 7c of the HDD 7. With regard to shaking along a surface that is orthogonal to the above described applied external disturbance, since the first buffer materials 30 buckle independently of the second buffer materials 29, the buffer part 30 can lessen the shaking. As a result, impact applied to the HDD 7 can be absorbed and/or lessened by the first buffer materials 30 and the second buffer materials 29 in all directions.

It should be noted that, although description has been provided in the present embodiment for a configuration in which the second buffer materials 29 are attached firmly to the bottom surface 7c of the HDD 7; it is possible to firmly attach the first buffer materials 30 to the bottom surface 7c of the HDD 7 and firmly attach the second buffer materials 29 to the lower principal surface 6a of the case 6.

Furthermore, although the first buffer materials 30 are described to have a column shape in the present embodiment, other shapes can be used including, for example, a plate-like shape having thickness in the obverse-and-reverse side of the paper surface of FIG. 19A, and hollow forms whose cross sections are, for example, quadrangular or circular.

With a configuration in which the buckling parts 32a of the first buffer materials 32 and the second buffer materials 31 are provided so as to serially stand with respect to the HDD 7, impact-lessening through the above described action can be achieved against external disturbance in the perpendicular direction with respect to the lower principal surface 6a of the case 6 and the bottom surface 7c of the HDD 7. With regard to shaking along a surface orthogonal to the direction of the above described applied apply external disturbance, since the buckling parts 32a are formed independently of the second buffer materials 31, the buckling parts 32a can lessen, for example, the shaking motion of the HDD 7. Furthermore, by providing the support parts 32b at interfaces between the buckling parts 32a of the first buffer materials 32 and the HDD 7, it is possible to install with further certainty the first buffer materials 32 with respect to the HDD 7, and improve buffering effect against external disturbance in, for example, directions perpendicular and/or parallel to the bottom surface 7c of the HDD 7.

Although description has been provided above for a configuration in which the support parts 32b of the first buffer materials 32 are attached firmly to the bottom surface 7c of the HDD 7, and the buckling parts 32a are attached firmly to the second buffer materials 31, it is possible to use other configurations such as a configuration in which the buckling parts 32a are attached firmly to the bottom surface 7c of the HDD 7 and the support parts 32b are attached firmly to the second buffer materials 31; or a configuration in which the support parts 32b are formed on both ends of the buckling parts 32a. It is also possible to use other configurations such as a configuration in which the support parts 32b of the first buffer materials 32 are attached firmly to the lower principal surface 6a of the case 6, a configuration in which the buckling parts 32a of the first buffer materials 32 are attached firmly to the lower principal surface 6a of the case 6, or a configuration in which the support parts 32b are formed on both ends of the buckling parts 32a.

Furthermore, although the buckling parts 32a of the first buffer materials 32 are described to have a column shape; other shapes can be used including, for example, a plate-like shape having thickness in the obverse-and-reverse side of the paper surface of FIG. 20A, and hollow forms whose cross sections are, for example, quadrangular or circular. For example, when the buckling parts 32a have plate-like shapes, the buckling parts 32a can resist external disturbance applied parallel to the surface. Furthermore, since it is possible to have a larger area size for the column when the shape of the buckling parts 32a is, for example, a hollow column shape; it is possible to improve resistance to external disturbance for the amount of the enlarged area size. In addition, since the direction of flexuous deformation by the buckling parts 32a can be unified, it is possible to widen the applying direction of the impact that can be lessened.

It should be noted that, in the description of all the above described embodiments, an HDD that is to be mounted on a PC is used as an example. However, the present disclosure is not limited to an HDD, and can be apply to electronic apparatuses overall, such as, for example, optical disk drives, display equipment including various display panels, wireless transmitter/receivers in mobile devices, and the like.

As presented above, various embodiments have been described as examples of the technology according to the disclosure of the present application. However, the technology in the present disclosure is not limited to those described above, and embodiments having modifications, replacements, additions, and omissions made as appropriate are also applicable. Furthermore, components described in the above described embodiments may be combined to obtain a new embodiment.

Furthermore, embodiments have been described as examples of the technology according to the present disclosure. For this purpose, the accompanying drawings and the detailed description are provided.

Therefore, components in the accompanying drawings and the detail description may include not only components essential for solving problems, but also components that are provided to illustrate the above described technology and are not essential for solving problems. Therefore, such inessential components should not be readily construed as being essential based on the fact that such inessential components are shown in the accompanying drawings or mentioned in the detailed description.

Further, the above described embodiment has been described to exemplify the technology according to the present disclosure, and therefore, various modifications, replacements, additions, and omissions may be made within the scope of the claims and the scope of the equivalents thereof.

What is claimed is:

1. An electronic apparatus comprising:
an electronic component;
a case including a lower member supporting the electronic component; and
a buffer part interposed between a bottom surface of the electronic component and the lower member, wherein
the buffer part includes
a first buffer material, and
a second buffer material disposed apart from the first buffer material,
the second buffer material is attached to each of the bottom surface of the electronic component and the lower member, and the second buffer material contracts when a compression load is applied thereto from the bottom surface of the electronic component and the lower member, and is restored when the compression load is removed, and
the first buffer material is attached to the bottom surface of the electronic component or the lower member, and the first buffer material buckles when a compression load is applied thereto from the bottom surface of the electronic component and the lower member during the contraction of the second buffer material, and is restored when the compression load is removed.

2. The electronic apparatus according to claim 1, wherein the first buffer material includes:
a support part attached to the bottom surface of the electronic component or the lower member; and
a buckling part protruding from the support part and having a column shaped part that partially buckles when the compression load is applied thereto.

3. The electronic apparatus according to claim 2, wherein the buckling part has a circular cross section that is perpendicular to a direction in which the buckling part protrudes from the support part.

4. The electronic apparatus according to claim 2, wherein the buckling part is internally hollow at least from a boundary between an inner wall of the buckling part and the support part, to the bottom surface of the electronic component or a surface of the lower member.

5. The electronic apparatus according to claim 1, wherein a height of the first buffer material is lower than the height of the second buffer material.

6. The electronic apparatus according to claim 1, wherein:
the electronic component is an HDD (Hard Disk Drive);
the HDD includes an approximately rectangular-parallelpiped housing, and a disc shaped storage disk held inside the housing and parallel to a bottom surface of the housing; and
the buffer part is disposed in contact with or to oppose a part where the storage disk is not disposed within the housing of the HDD.

7. The electronic apparatus according to claim 6, wherein:
the case is an HDD case configured to house the HDD;
the lower member has a corner portion defined by first and second sides of the case being adjacent to each other,
the corner portion of the lower member comprises a first slit along the first side and a second slit along the second side,
an angle between the first slit and the second slit is equal to or larger than an angle of a corner portion of a lower surface of the HDD,
the first slit and the second slit connect to each other at the corner portion of the lower member, and form a penetration hole that extends completely through the lower member, and
an inner area of the corner portion of the lower member, that is inward of the penetration hole and bounded by the penetration hole, contacts with and supports the corner portion of the lower surface of the HDD.

8. The electronic apparatus according to claim 1, wherein the first buffer material has a column shape, and
the second buffer material has a plate shape.

9. The electronic apparatus according to claim 1, wherein the first buffer material has a cylindrical shape that opens at a top end thereof.

10. An electronic apparatus comprising:
a disk drive having a housing;
a case including a lower member supporting the disk drive; and
a buffer part interposed between a bottom surface of the housing and the lower member, wherein
the buffer part includes
a first buffer material, and
a second buffer material disposed apart from the first buffer material,
the second buffer material is attached to each of the bottom surface of the housing and the lower member, and the second buffer material contracts when a compression load is applied thereto from the bottom surface of the housing and the lower member, and is restored to a shape that the second buffer member has before the contraction when the compression load is removed, and
the first buffer material is attached to the bottom surface of the housing or the lower member, and the first buffer material buckles when a compression load is applied thereto from the bottom surface of the housing and the lower member during the contraction of the second buffer material, and is restored to a shape that the first buffer member has before the buckling when the compression load is removed.

* * * * *